United States Patent
Otani et al.

(10) Patent No.: US 12,499,295 B2
(45) Date of Patent: Dec. 16, 2025

(54) SOFTWARE APPLICATIONS OFFLOADING TO ACCELERATORS

(71) Applicant: NTT, Inc., Tokyo (JP)

(72) Inventors: Ikuo Otani, Musashino (JP); Noritaka Horikome, Musashino (JP)

(73) Assignee: NTT, Inc., Tokyo (JP)

( * ) Notice: Subject to any disclaimer, the term of this patent is extended or adjusted under 35 U.S.C. 154(b) by 1029 days.

(21) Appl. No.: 17/622,183

(22) PCT Filed: Jun. 25, 2019

(86) PCT No.: PCT/JP2019/025240
§ 371 (c)(1),
(2) Date: Dec. 22, 2021

(87) PCT Pub. No.: WO2020/261399
PCT Pub. Date: Dec. 30, 2020

(65) Prior Publication Data
US 2022/0358263 A1 Nov. 10, 2022

(51) Int. Cl.
*G06F 30/20* (2020.01)
*G06F 30/34* (2020.01)

(52) U.S. Cl.
CPC .............. *G06F 30/20* (2020.01); *G06F 30/34* (2020.01)

(58) Field of Classification Search
CPC ................................ G06F 30/20; G06F 30/34
USPC .................................................. 703/2; 702/2
See application file for complete search history.

(56) References Cited

U.S. PATENT DOCUMENTS

2011/0282832 A1* 11/2011 Rishel ..................... G06F 16/27
707/E17.007

FOREIGN PATENT DOCUMENTS

KR  10-2005-0002608  * 1/2005

OTHER PUBLICATIONS

Au, "Intel FPGAs Accelerate Artificial Intelligence for Deep Learning in Microsoft's Bing Intelligent Search (Editorial)," Intel Corporation Internews Room, dated Mar. 27, 2018, retrieved from URL <https://newsroom.intel.co.jp/editorials/intel-fpgas-accelerating-artificial-intelligence-deep-learning-bing-intelligent-search/#gs.1jawxe>, 6 pages (with English Translation).
(Continued)

*Primary Examiner* — Brian S Cook
(74) *Attorney, Agent, or Firm* — Fish & Richardson P.C.

(57) ABSTRACT

A server control apparatus 100 includes a request and configuration collection unit 120 that acquires a request to offload a certain process of an application to an accelerator for each application in a server, and configurations of the accelerator and the application in a server 30, an optimization arithmetic unit 130 that determines, by referring to information of the acquired request and configurations of the server 30, a ratio of processing performance to the request, and optimizes allocation of the accelerator so that variance of the ratio between the applications is equal to or less than a predetermined threshold, and a configuration determination unit 140 that determines a configuration suggestion to be taken by the server 30 by using an arithmetic result from the optimization arithmetic unit 130 and a predetermined policy, and commands the server 30 to execute the configuration suggestion.

6 Claims, 31 Drawing Sheets

(56) References Cited

OTHER PUBLICATIONS

Tanisho, "Efforts to develop SmartNIC firmware using P4/C," Okinawa Open Days 2017, dated Dec. 4, 2017, retrieved from URL <https://www.okinawaopenlabs.com/ood/2017/wp-content/uploads/sites/4/2017/12/fujitsu_3.pdf>, 49 pages (with English Translation).

\* cited by examiner

| APL ID | THE NUMBER OF REQUESTS |
|---|---|
| APL#1 | 70 |
| APL#2 | 20 |
| APL#3 | 10 |

317 e AGGREGATE FROM ALL SERVERS

| APL ID | THE NUMBER OF REQUESTS |
|---|---|
| APL#1 | 700 |
| APL#2 | 300 |
| APL#3 | 100 |

SOFTWARE APPLICATIONS OFFLOADING TO ACCELERATORS

CROSS-REFERENCE TO RELATED APPLICATIONS

This application is a National Stage application under 35 U.S.C. § 371 of International Application No. PCT/JP2019/025240, having an International Filing Date of Jun. 25, 2019, the disclosure of which is considered part of the disclosure of this application, and is incorporated in its entirety into this application.

TECHNICAL FIELD

The present invention relates to a server control apparatus, a server control method, and a program.

BACKGROUND ART

There have been increasing examples that offload some of the processes of a software application (hereinafter, referred to as "APL") to an accelerator such as a Graphics Processing Unit (GPU) or a Field Programmable Gate Array (FPGA) to implement performance and power efficiency that cannot be reached by software (CPU processing) alone. A case is envisioned in which such an accelerator as described above is applied in a large server cluster such as a Network Functions Virtualization (NFV) or a data center (see NPL 1, NPL 2).

The offloading of server load factors of the related art is described.

FIG. 17 is a schematic configuration diagram of an arithmetic system in which an arithmetic device dedicated to certain processing is added to a general purpose computer. A left view of FIG. 17 is a configuration diagram of an arithmetic system 10A that is not programmable (to which any function cannot be added).

The arithmetic system 10A illustrated in the left view of FIG. 17 includes a CPU 11 and a Network Interface Card (NIC) 12 for connecting to a communication network. The CPU 11 is a core processor incorporating a plurality of cores 11a. FIG. 17 illustrates image representation of situations in which an APL and packet processing use the cores 11a. As illustrated by a thin arrow in the left view of FIG. 17, the CPU 11 in the arithmetic system 10A must perform packet processing (or parallel processing of packet processing and APL) prior to execution of the APL, and the processing speed thereof is slow.

An arithmetic system 10B illustrated in a right view of FIG. 17 includes a SmartNIC 13 that is an NIC with an accelerator, instead of the NIC 12. The SmartNIC 13 is an NIC that can offload a process putting a load such as IP packet processing causing a processing capability to decrease, and reduce the load on the CPU 11. The SmartNIC 13 can program for an arithmetic circuit for packet processing and offload the packet processing program (see a reference sign a in FIG. 17). As indicated by a thick arrow in the right view of FIG. 17, the SmartNIC 13 can be utilized to improve processing capabilities, e.g., by acceleration in a virtual server environment.

CITATION LIST

Non Patent Literature

NPL 1: Tanisho, et al., "Initiatives for development of SmartNIC firmware using P4/C", [online], Oki-nawaOpenDays2017. <URL: https://www.okinawaopenlabs.com/ood/2017/wp-content/uploads/sites/4/2017/12/fujitsu3.pdf NPL 2: "Intel FPGAs Accelerate Artificial Intelligence for Deep Learning in Microsoft's Bing Intelligent Search", [online], Internews room, 2018. <URL: https://news-room.intel.co.jp/editorials/intel-fpgas-accelerating-artificial-intelligence-deep-learning-bing-intelligent-search/#gs.1jawxe>

SUMMARY OF THE INVENTION

Technical Problem

However, because the capacitance of electronic circuitry that may be incorporated into an FPGA is limited, it is difficult to offload some of multiple types of APL. Thus, in a cluster that performs multiple types of APL, the overall throughput may not be improved without optimizing which FPGA offloads some of which APL.

FIGS. 18A to 18D are diagrams illustrating offloading in a case that connection with an FPGA is required for an APL. A server cluster such as the NFV or the data center includes a plurality of (here, four) servers 20-1 to 20. Each of the servers 20-1 to 20-4 include an FPGA 21 and offload some of processes of the APL to the FPGA 21.

In the servers 20-1 to 20-4 illustrated in FIGS. 18A to 18D, connection with the FPGA 21 is required for a certain APL. Here, in the servers 20-1 and 20-2 illustrated in FIGS. 18A and 18B, the connection with the FPGA 21 is required for an APL 1, and in the servers 20-3 and 20-4 illustrated in FIGS. 18C and 18D, the connection with the FPGA 21 is required for an APL 2.

As illustrated in FIGS. 18A and 18B, the servers 20-1 and 20-2 offload a certain APL (APL 1) into the FPGA 21, while other APL (APL 2) is not load thereon (the APL 2 cannot be offloaded). Therefore, an overload state occurs as indicated by a reference sign b in FIGS. 18A and 18B. On the other hand, as illustrated in FIGS. 18C and 18D, the servers 20-3 and 20-4 offload a certain APL (APL 2) into the FPGA 21 (there is a margin for a load to offload the APL 2).

In this manner, in the case that the connection with the FPGA is required for the APL, if allocation of the FPGA 21 is unbalanced with respect to the APL load, an APL limit is reached and the overall throughput decreases.

FIGS. 19A to 19D are diagrams illustrating offloading in a case that connection with an FPGA is optional for an APL. The servers 20-1 to 20-4 include the FPGA 21 and optionally connect the FPGA 21 to the APL to offload some of processes of the APL to the FPGA 21. In the servers 20-1 to 20-4 illustrated in FIGS. 19A to 19D, the connection with the FPGA 21 is optional for a certain APL. Here, the servers 20-1 and 20-2 illustrated in FIGS. 19A and 19B connect the FPGA 21 to the APL 1, and the servers 20-3 and 20-4 illustrated in FIGS. 19C and 19D connect the FPGA 21 to the APL 2. In addition, the APL 1 is to be larger in the APL load than the APL 2.

As illustrated in FIGS. 19A and 19B, the servers 20-1 and 20-2 offload the APL 1 with the large APL load into the FPGA 21, and so, in the servers 20-1 and 20-2, none of the APL 1 and APL 2 reaches the APL limit. In contrast, as indicated by a reference sign c in FIGS. 19C and 19D, the servers 20-3 and 20-4 offload the APL 2 with the smaller APL load into the FPGA 21, and so, the APL limit is reached for the APL 1 and the throughput decreases.

In this manner, in the case that the connection with the FPGA is optional for the APL, if the allocation of the FPGA 21 is unbalanced with respect to the APL load even though a certain APL is offloaded into the FPGA and the other APL can be still put thereon, the APL limit is reached and the overall throughput decreases.

The present invention has been made in view of such a background, and has an object to provide a network system and a network bandwidth control management method capable of improving throughput and availability of a server to which an accelerator is applied.

Means for Solving the Problem

In order to solve the problems described above, the present invention provides a server control apparatus including: an acquisition unit configured to acquire a request to offload a certain process of an application of applications to an accelerator for each of the applications in a server, and configurations of the accelerator and the application in the server; an optimization arithmetic unit configured to determine, by referring to information of the request acquired and the configurations acquired of the server, a ratio of processing performance to the request, and optimize allocation of the accelerator so that variance of the ratio between the applications is equal to or less than a predetermined threshold; and a determination unit configured to determine a configuration suggestion to be taken by the server by using an arithmetic result from the optimization arithmetic unit and a predetermined policy, and command the server to execute the configuration suggestion.

Effects of the Invention

According to the present invention, it is possible to provide a server control apparatus, a server control method, and a program capable of improving the throughput and availability of a server to which an accelerator is applied.

BRIEF DESCRIPTION OF DRAWINGS

FIG. 7 is a diagram illustrating an example in which a current request table for the APL control unit is aggregated to create a total request table for the server control apparatus according to the present embodiment.

DESCRIPTION OF EMBODIMENTS

Hereinafter, a network system and the like in a mode for implementing the present invention (hereinafter referred to as the "embodiment of the present invention") will be described with reference to the drawings.

Embodiment

Configuration of Network System 1

Figure 1:
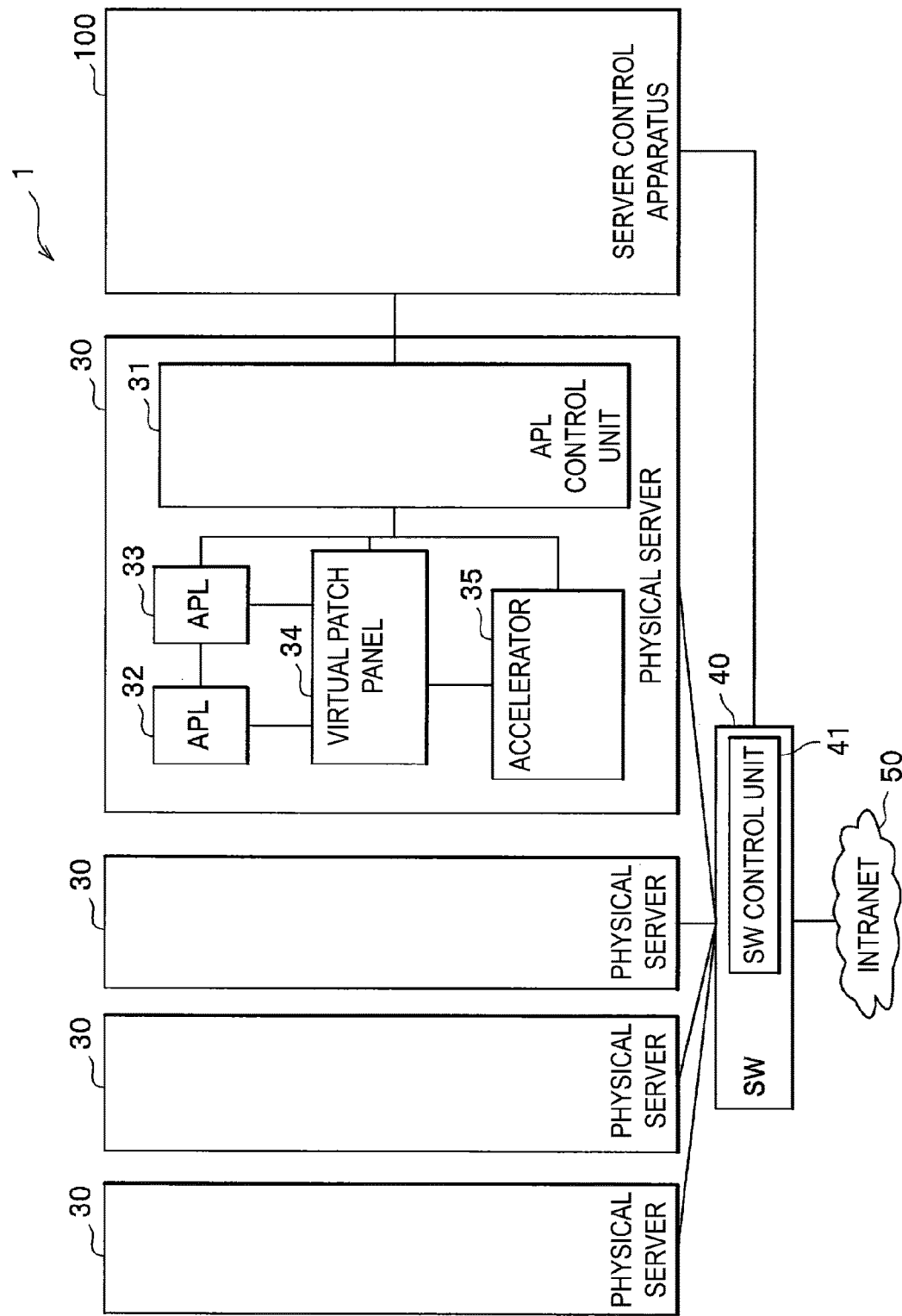
FIG. 1 is a diagram illustrating a configuration example of a network system including a server control apparatus according to an embodiment of the present invention.

FIG. 1 is a diagram illustrating a configuration example of a network system including a server control apparatus 100 according to an embodiment of the present invention.

As illustrated in FIG. 1, the network system 1 includes a plurality of physical servers 30, a switch (SW) 40 that connects the physical servers 30 to an intranet 50, and the server control apparatus 100 that controls accelerator utilization of the physical server 30. The SW 40 includes a SW control unit 41.

Each of the physical server 30 includes an APL control unit 31, APLs 32 and 33, a virtual patch panel 34, and an accelerator 35.

In the network system 1, the intranet 50 and the physical servers 30 are connected by the SW 40. In the physical server 30, the accelerator 35 and each of the APLs 32 and 33 are connected to each other via the virtual patch panel 34. Instead of the virtual patch panel 34, a virtual switch may be used.

In the network system 1, each of the APLs 32 and 33 is connected to the accelerator 35 via the virtual patch panel 34 and the virtual switch (not illustrated). A Soft Patch Panel (SPP), which is an application, is used for flexible connection change in units of module as in a Service Function Chaining (SFC). The SPP provides a shared memory between Virtual Machines (VMs) which are configured to directly refer to an identical memory space to eliminate packet copy in a virtualization layer. To exchange packets between the physical Network Interface Card (NIC) and the shared memory, the SPP may control a reference destination for memory exchange of each VM to change input and output destination of the packet by software. In this way, the SPP realizes dynamic connection switching between the VMs and between each VM and the physical NIC.

Configurations of Server Control Apparatus 100 and APL Control Unit 31

Figure 2:
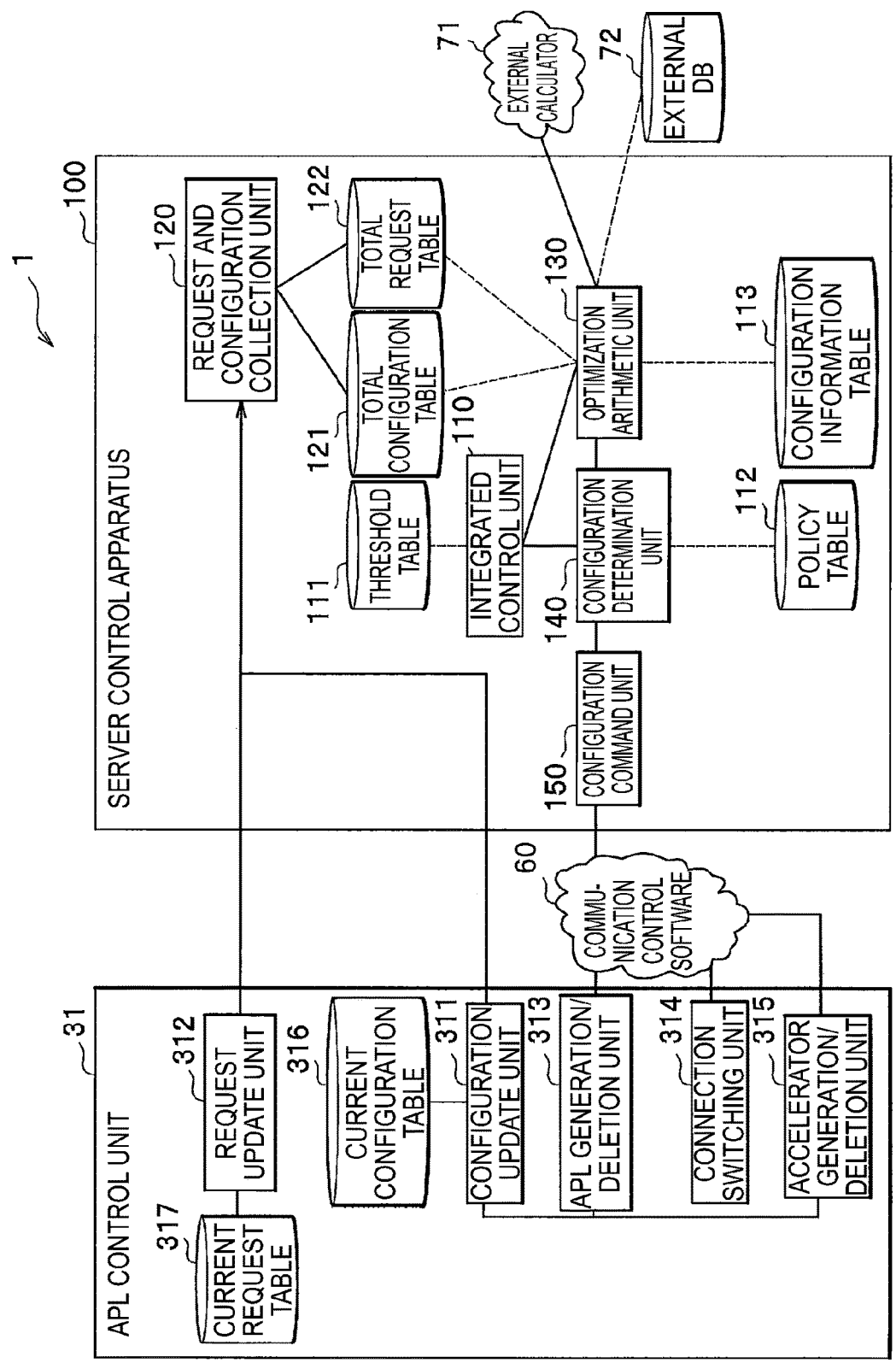
FIG. 2 is a diagram illustrating configurations of the server control apparatus and an APL control unit according to the present embodiment.

FIG. 2 is a diagram illustrating configurations of the server control apparatus 100 and the APL control unit 31.

Server Control Apparatus 100

The server control apparatus 100 is disposed in the network system 1, and instructs the APL control unit 31 of each physical server 30 (see FIG. 1) to change the configuration. As illustrated in FIG. 2, the server control apparatus 100 includes an integrated control unit 110, a request and configuration collection unit (acquisition unit) 120, an optimization arithmetic unit 130, a configuration determination unit 140 (determination unit), a configuration command unit 150, a threshold table 111 (threshold storage unit), a policy table 112, a configuration information table 113, a total configuration table 121, and a total request table 122.

The integrated control unit 110 issues an arithmetic request to the optimization arithmetic unit 130 periodically or through an instruction by an operator.

The integrated control unit 110 acquires a threshold from the threshold table 111, and determines whether an arithmetic result of the optimization arithmetic unit 130 exceeds the threshold of the threshold table 111.

The request and configuration collection unit 120 acquires a request to offload a certain process of an application to an accelerator for each application in each of the physical servers 30, and configurations of the accelerator and application in the server, and stores the acquired request and configuration in the total request table 122 and the total configuration table 121, respectively.

The optimization arithmetic unit 130 determines, by referring to the acquired information of the request and configurations of the physical server 30, a performance-to-request ratio (P/R) that is a ratio of processing performance to the request, and optimizes the allocation of the accelerator so that variance of the performance-to-request ratio between the applications is equal to or less than a predetermined threshold.

The optimization arithmetic unit 130 calculates a performance-to-request ratio (P/R) for a current allocation of the accelerator.

The optimization arithmetic unit 130 performs arithmetic of the performance-to-request ratio (P/R) in accordance with Equation (2) or Equation (3) described below.

The optimization arithmetic unit 130 optimizes the allocation of the accelerator in ranges of capacity conditions indicated by Relationship (4) and Relationship (5) described below.

The optimization arithmetic unit 130 performs an optimization arithmetic that minimizes divergence of the performance-to-request ratio (P/R) in accordance with the expression (6) described below.

The optimization arithmetic unit 130 may perform the optimization arithmetic on the allocation of the accelerator by using processing capability of the optimization arithmetic unit 130 itself or processing capability of an external calculator 71 (see FIG. 2). In a case that arithmetic results are included in an external DB 72, the optimization arithmetic unit 130 may refer to the arithmetic results stored in the external DB 72.

The configuration determination unit 140 acquires a policy from the policy table 112. The configuration determination unit 140 determines a configuration suggestion to be taken by the physical server 30 by using the arithmetic result received from the integrated control unit 110 and the policy.

The configuration command unit 150 is an interface for commanding the physical server 30 to execute the configuration suggestion determined by the configuration determination unit 140.

Details of the threshold table 111, the policy table 112, the configuration information table 113, the total configuration table 121, and the total request table 122 are described below.

APL Control Unit 31

The APL control unit 31 performs APL control for offloading a certain process of the APL to the accelerator.

The APL control unit 31 changes configurations of generation or deletion of the APL and accelerator, and the virtual patch panel 34 in the physical server 30 (see FIG. 1) in accordance with the instruction from the server control apparatus 100.

As illustrated in FIG. 2, the APL control unit 31 includes a configuration update unit 311, a request update unit 312, an APL generation/deletion unit 313, a connection switching unit 314, an accelerator generation/deletion unit 315, a current configuration table 316, and a current request table 317.

The configuration update unit 311 updates the configurations of the accelerator and APL of the physical server 30 stored in the current configuration table 316, and transmits the updated configurations of the accelerator and APL to the request and configuration collection unit 120 of the server control apparatus 100.

The request update unit 312 updates the request stored in the current request table 317 and transmits the updated request to the request and configuration collection unit 120 of the server control apparatus 100.

The APL generation/deletion unit 313 generates or deletes the APL in accordance with a configuration command (configuration suggestion) instruction from the server control apparatus 100.

The connection switching unit 314 switches the connection through the virtual patch panel 34 in accordance with the configuration command (configuration suggestion) instruction from the server control apparatus 100.

The accelerator generation/deletion unit 315 generates or deletes the accelerator in accordance with the configuration command (configuration suggestion) instruction from the server control apparatus 100.

The configuration command unit 150 of the server control apparatus 100 and the APL control unit 31 may be directly connected to each other, and may be connected on communication control software 60 by executing the communication control software 60 as illustrated in FIG. 2.

Table Configuration

Next, the threshold table 111, the policy table 112, the configuration information table 113, the total configuration table 121, and the total request table 122 for the server control apparatus 100 will be described.

The above-described threshold table 111, policy table 112, and configuration information table 113 configure basic operating parameters for the physical server 30. The above-described total configuration table 121 and total request table 122 are tables in which the data of the physical servers 30 are aggregated, and have similar configurations (items) to those of the current configuration table 316 and the current request table 317 for the APL control unit 31, respectively.

Table Configuration of Server Control Apparatus 100

Figure 3:
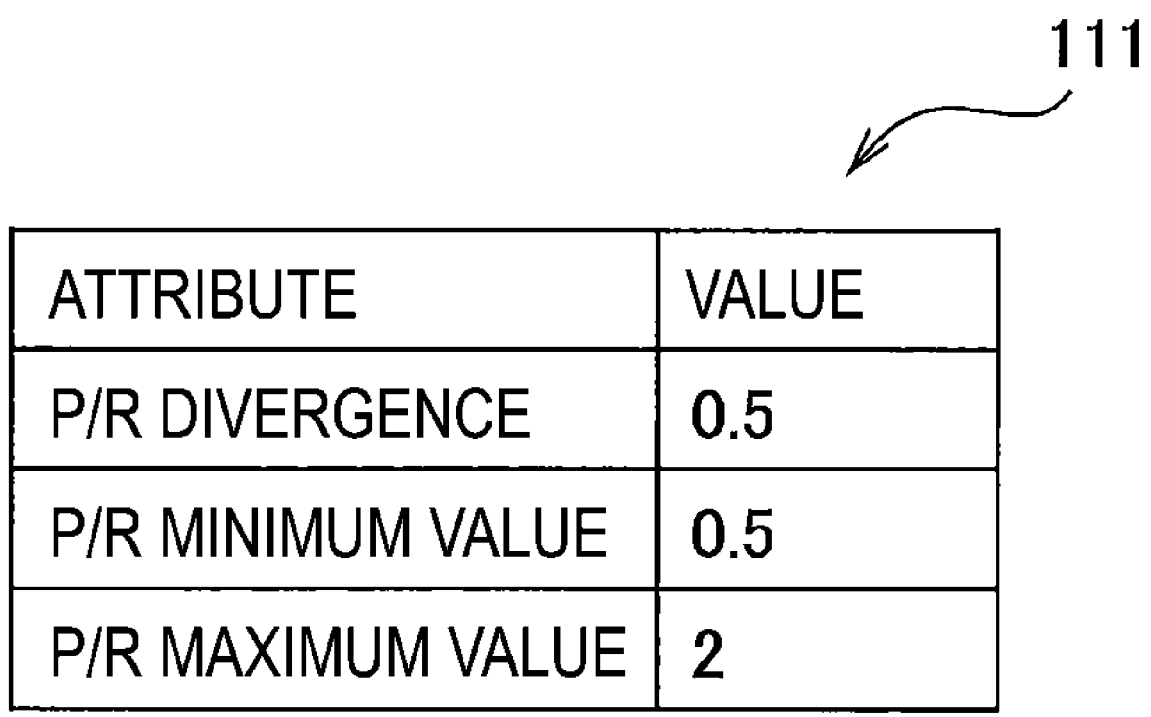
FIG. 3 is a diagram illustrating an example of a threshold table for the server control apparatus according to the present embodiment.

FIG. 3 is a diagram illustrating an example of the threshold table 111 for the server control apparatus 100.

As illustrated in FIG. 3, the threshold table 111 holds an attribute of the parameter using the performance-to-request ratio (P/R) and a threshold in a case of applying the parameter. The above attribute includes a P/R divergence, a P/R minimum value, and a P/R maximum value, values of which are "0.5", "0.5", and "2", respectively.

Here, P indicates performance, R indicates a request, and P/R indicates a performance-to-request ratio.

Figure 15:
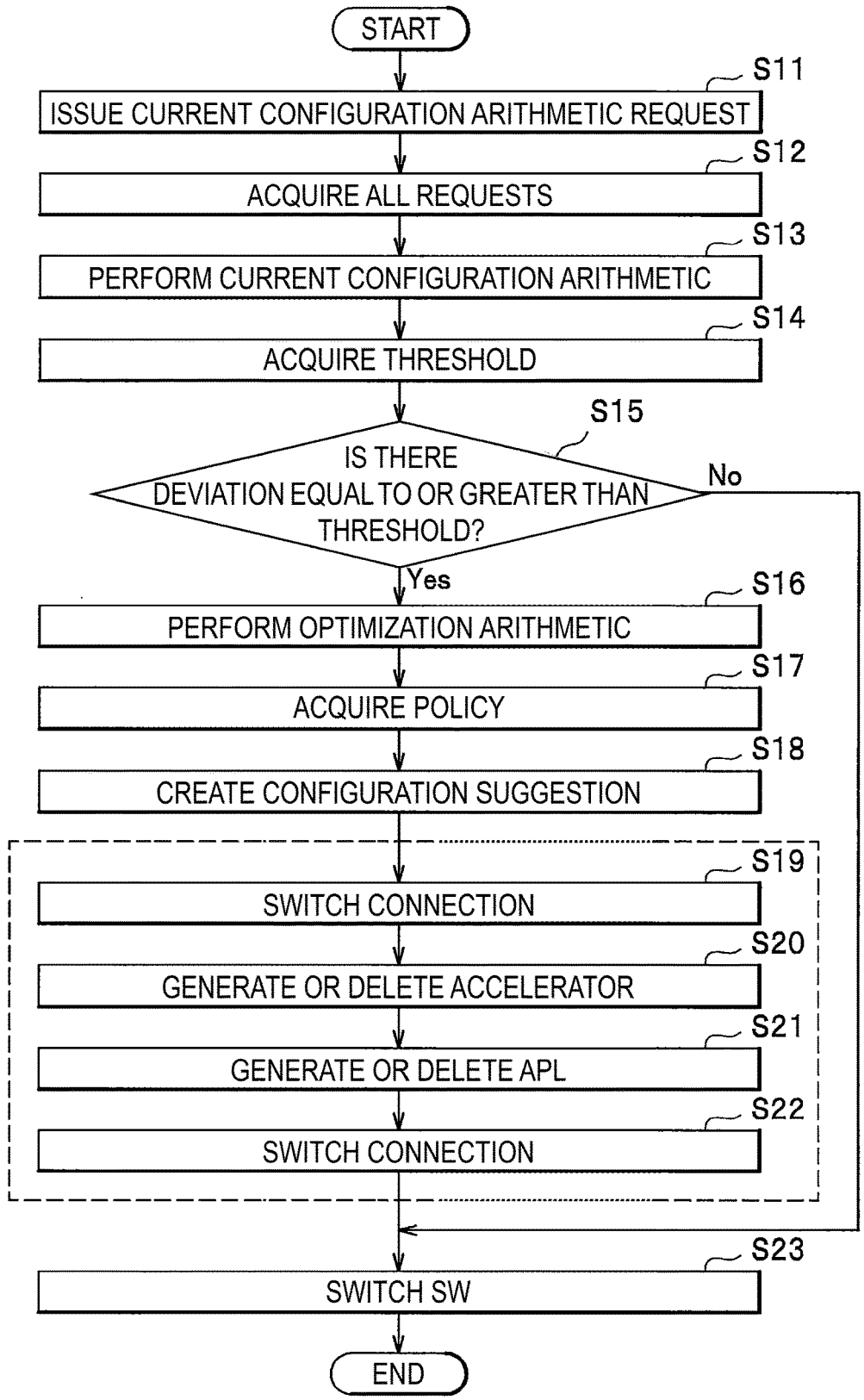
FIG. 15 is a flowchart illustrating a server control method for the server control apparatus according to the present embodiment.

In a case that the divergence of P/R exceeds the value of "0.5", the server control apparatus 100 performs an optimization arithmetic (step S16 in FIG. 15).

In a case that the minimum value of P/R falls below the value of "0.5", the server control apparatus 100 performs the optimization arithmetic (step S16 in FIG. 15).

In a case that the maximum value of P/R exceeds the value of "2", the server control apparatus 100 performs the optimization arithmetic (step S16 in FIG. 15).

Note that it is sufficient that at least one of the divergence of the ratio, the minimum value of the ratio, and the maximum value of the ratio may be included as the parameter of the ratio.

Figure 4:
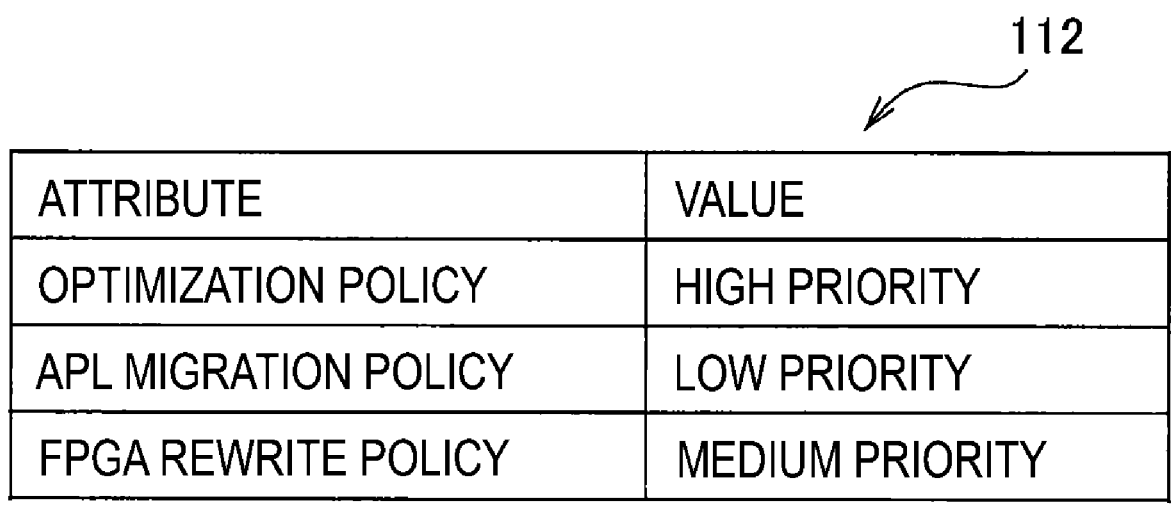
FIG. 4 is a diagram illustrating an example of a policy table for the server control apparatus according to the present embodiment.

FIG. 4 is a diagram illustrating an example of the policy table 112 for the server control apparatus 100.

As illustrated in FIG. 4, the policy table 112 holds an attribute indicating a policy and a priority based on a value of the attribute. The above attribute includes an optimization policy, an APL migration policy, and an FPGA rewrite policy, values of which are, for example, "high priority", "low priority", and "medium priority", respectively.

The optimization policy determines how strict with optimization calculation results of P/R.

The APL migration policy determines whether to suppress the number of APL migrations.

The FPGA rewrite policy determines whether to suppress the number of FPGA rewrites.

Figure 5:
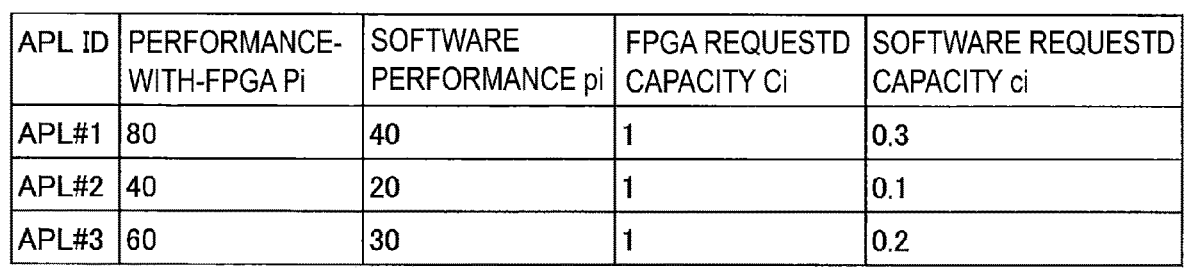
FIG. 5 is a diagram illustrating an example of a configuration information table for the server control apparatus according to the present embodiment.

FIG. 5 is a diagram illustrating an example of the configuration information table 113 for the server control apparatus 100.

As illustrated in FIG. 5, the configuration information table 113 holds values of performance-with-FPGA Pi, software performance pi, FPGA required capacity Ci, and software required capacity ci for each APL ID.

For example, APL #1 has the performance-with-FPGA Pi of "80", the software performance pi of "40", the FPGA required capacity Ci of "1 (1 represents 100%)", and the software required capacity ci of "0.3 (1 represents 100%)". The APL #1 has the performance-with-FPGA Pi and software performance pi greater than those of other APLs, and thus, has the software required capacity ci larger than those of other APLs.

An APL #2 has the performance-with-FPGA Pi of "40", the software performance pi of "20", the FPGA required capacity Ci of "1", and the software required capacity ci of "0.1", that is, has the performance-with-FPGA Pi, the software performance pi, and the software required capacity ci smaller than those of the other APLs.

An APL #3 has the performance-with-FPGA Pi of "60", the software performance pi of "30", the FPGA required capacity Ci of "1", and the software required capacity ci of "0.2", that is, has the performance-with-FPGA Pi, the software performance pi, and the software required capacity ci which are medium degrees as compared to those of the other APLs.

As described above, the above-described total configuration table 121 and total request table 122 are tables in which the data of the physical servers 30 are aggregated.

Figure 6:
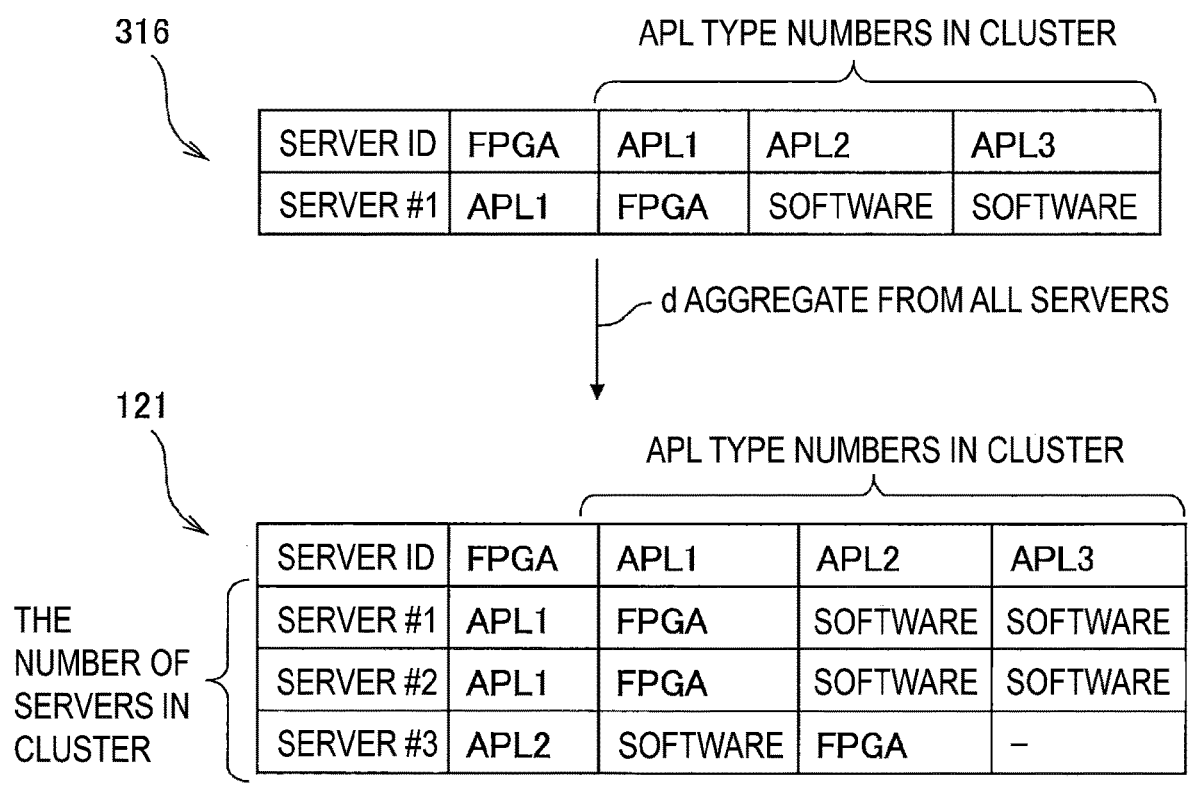
FIG. 6 is a diagram illustrating an example in which current configuration tables for the APL control units are aggregated to create a total configuration table for the server control apparatus according to the present embodiment.

FIG. 6 is a diagram illustrating an example in which the current configuration tables 316 for the APL control units 31 are aggregated to create the total configuration table 121 for the server control apparatus 100.

As illustrated in a lower view of FIG. 6, the total configuration table 121 has the same configuration as the current configuration table 316 for each of the APL control units 31, and holds an FPGA and APL type numbers (here, APL 1, APL 2, and APL 3) in the cluster for each server ID column. The total configuration table 121 holds the number of servers aggregated in the cluster for each server ID row. Note that the current configuration table 316 (see an upper view of FIG. 6) for the APL control unit 31 do not include this row.

Here, an FPGA column in the total configuration table 121 illustrated in the lower view of FIG. 6 indicates by which APL the FPGA is occupied. The "FPGA" in each APL column indicates that an acceleration portion of the APL is implemented by the FPGA. Furthermore, the "SOFT-WARE" in each APL row indicates that the acceleration portion of the APL is implemented by software. A character "-" indicates that the APL is not included.

FIG. 7 is a diagram illustrating an example in which the current request table 317 for the APL control unit 31 is aggregated to create the total request table 122 for the server control apparatus 100.

As illustrated in a lower view of FIG. 7, the total request table 122 has the same configuration as that of the current request table 317 for the APL control unit 31, and holds the number of aggregated requests for each APL ID. For example, the number of requests aggregated from all the servers for the APL #1 is "700", the number of requests aggregated from all the servers for the APL #2 is "300", and the number of requests aggregated from all the servers for the APL #3 is "100", where the number of requests for the APL #1 is the largest. By referring to the total request table 122, it is considered effective to offload the APL with a large number of requests to the FPGA.

Table Configuration of APL Control Unit 31

As illustrated in the upper view of FIG. 6, the current configuration table 316 for the APL control unit 31 holds an FPGA and APL type numbers (APL 1, APL 2, and APL 3) in the cluster for each server ID.

The example in the upper view of FIG. 6 indicates that in a server #1, the FPGA is occupied by the APL 1, and the acceleration portion of the APL for the APL 1 indicating the APL type number in the cluster is implemented by the "FPGA" and the acceleration portions of the APL for the APL 2 and the APL 3 are implemented by "SOFTWARE".

As indicated by a reference sign d in FIG. 6, the current configuration tables 316 for the APL control units 31 are aggregated by the request and configuration collection unit 120 (see FIG. 2) from all the severs, and stored in the total configuration table 121.

As illustrated in the upper view of FIG. 7, the current request table 317 for the APL control unit 31 holds the number of requests for each APL ID. In the example in the upper view of FIG. 7, the number of requests for the APL #1 is "70", the number of requests for the APL #2 is "20", and the number of requests for the APL #3 is "10", where the number of requests for the APL #1 is the largest.

As indicated by a reference sign e in FIG. 7, the current request table 317 for the APL control unit 31 is aggregated by the request and configuration collection unit 120 (see FIG. 2) from all the severs, and stored in the total request table 122.

Note that even if the number of requests for an APL in the current request table 317 is large in a certain physical server 30, the number of requests for APL is not necessarily large in a case of aggregation from all the servers. By referring to the total request table 122 aggregated from all the server, it is possible to offload the APL with a large number of requests to the FPGA.

The items and values of the tables described above are examples and are not limited thereto.

Hereinafter, a sever control method for the server control apparatus 100 configured as described above will be described.

Accelerator Allocation

Figure 8:
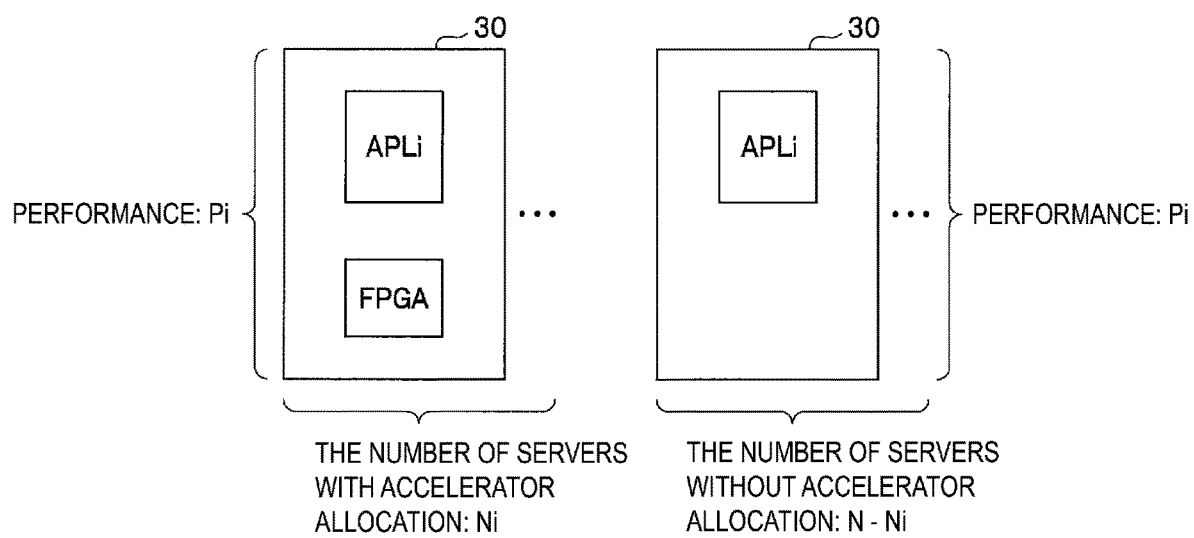
FIG. 8 is a diagram illustrating accelerator allocation of the server control apparatus according to the present embodiment.

FIG. 8 is a diagram illustrating the server control method for the server control apparatus 100. As illustrated in FIG. 8, the server control apparatus 100 configures the number of physical servers 30 in each of which a certain process of an APL is offloaded to the accelerator, to be N. The number N of physical servers is expressed by the number $Ni$ of physical servers with accelerator (FPGA) allocation for i (the type of APL), and the number ($N-Ni$) of physical servers without accelerator allocation.

In addition, Pi represents the performance of i with accelerator allocation, and pi represents the performance of i without accelerator allocation. Furthermore, Ri represents a request for i.

The server control apparatus 100 calculates a performance ratio to request for each APL, and calculates an accelerator allocation optimal solution such that the variance of the performance ratio between the APLs is reduced.

For example, the accelerator allocation optimal solution is calculated in accordance with Expression (1).

$$(NiPi+(N-Ni)pi)/Ri \qquad (1)$$

where the following is assumed:
N: the number of physical servers,
Ni: the number of accelerator allocations for i,
Pi: performance of i with accelerator allocation,
pi: performance of i without accelerator allocation, and
Ri: request for i,
here, $\Sigma Ni=N$.

Any method may be used for an optimal solution calculation method, such as heuristics, a Genetic Algorithm (GA), or Machine Learning (ML).

If the accelerator allocation optimal solution differs from a current state, the server control apparatus 100 rewrites contents of the accelerator for the APL with more allocations to contents of the accelerator for the APL with less allocations.

For example, assume that in a case that the accelerator allocation optimal solutions (ideals) for the APL 1, the APL 2, and the APL 3 are expressed as APL 1:APL 2:APL3=1:1:1, the current state is expressed as APL 1:APL 2:APL3=5:3:2. In this case, the performance of the APL 1 is excessive, and so the contents of the accelerator for the APL 1 are rewritten to the contents of the accelerator for the APL 3.

Accelerator Rewriting Method

Figure 9:
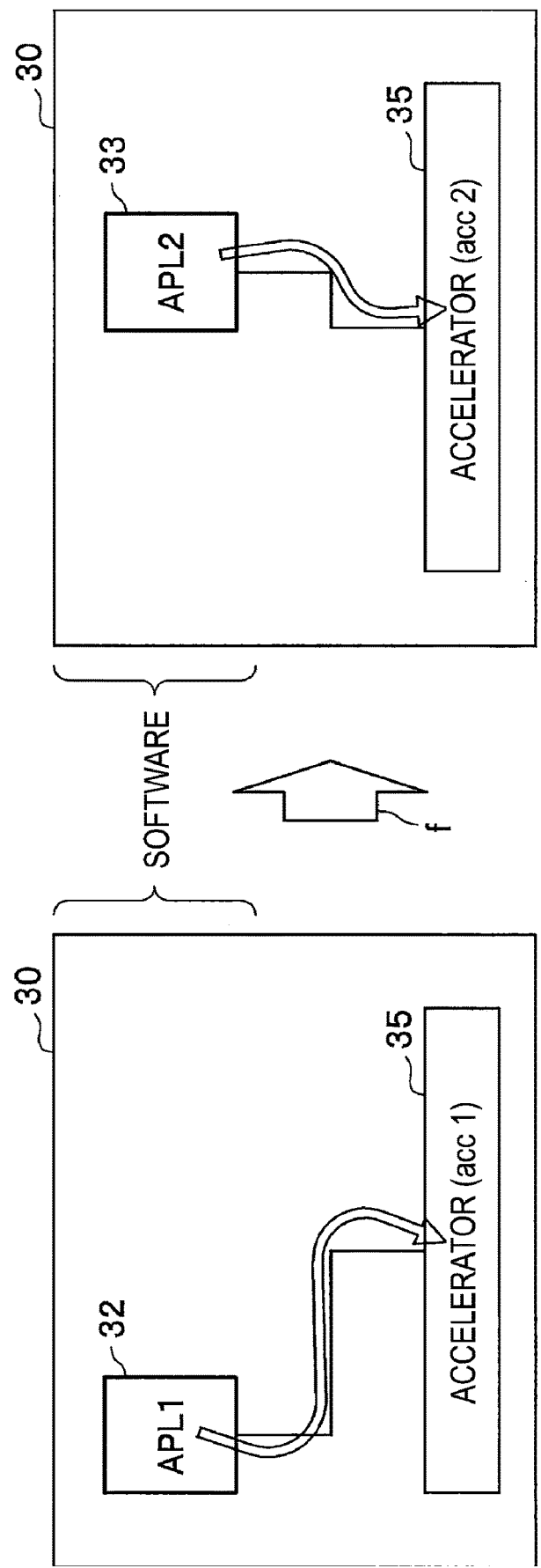
FIG. 9 is a diagram illustrating an accelerator rewriting method in a case that only a single APL is present on a physical server according to the present embodiment.
Figure 10:
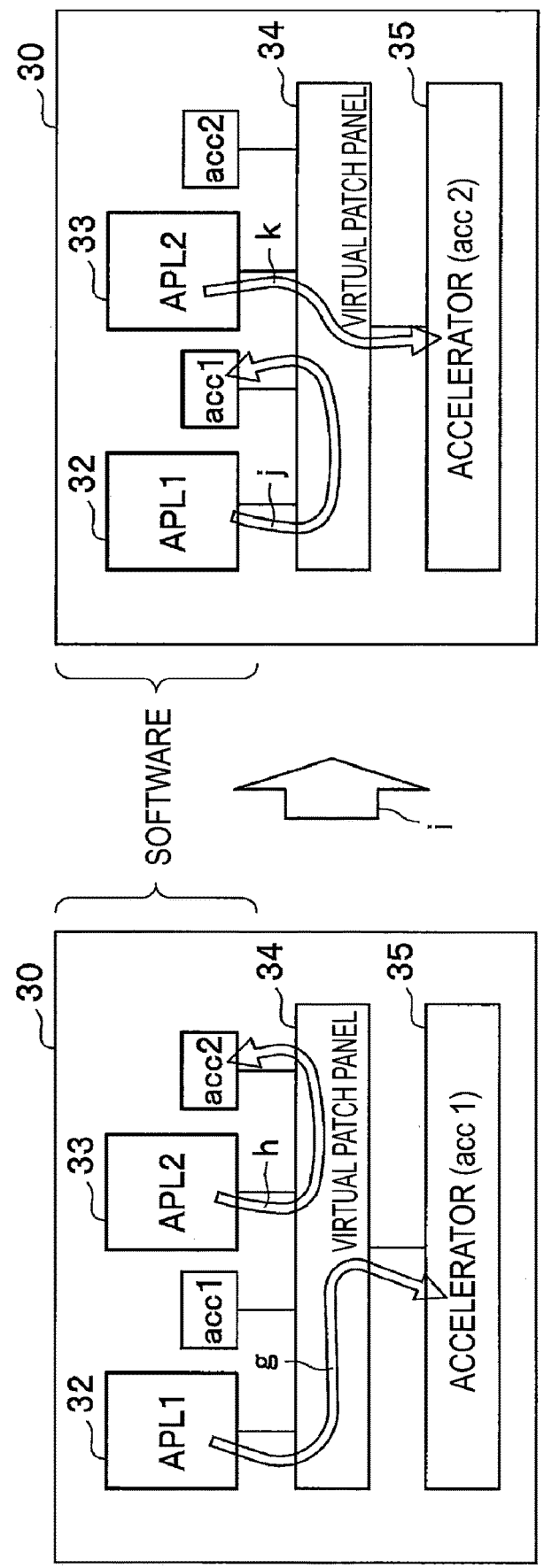
FIG. 10 is a diagram illustrating the accelerator rewriting method in a case that a plurality of APLs are mixedly present on the physical server according to the present embodiment.

An accelerator rewriting method can be divided into for a case that only a single APL is present on the physical server 30 (see FIG. 9) and for a case that a plurality of APLs are mixedly present on the physical server 30 (see FIG. 10). Note that, the case that only a single APL is present on the physical server 30 corresponds to the above-described case in FIGS. 18A to 18D, and the case that a plurality of APLs are mixedly present on the physical server 30 corresponds to the above-described case in FIGS. 19A to 19D.

Case of Only Single APL on Physical Server 30

FIG. 9 is a diagram illustrating the accelerator rewriting method in the case that only a single APL is present on the physical server 30. Arrows in FIG. 9 represent that part of the APL (software) is offloaded to the accelerator (acc).

As illustrated in a left view of FIG. 9, in the physical server 30, one APL (APL 1) occupies an accelerator (acc 1) and no other APL uses the accelerator (acc 1).

As indicated by the arrow in the left view of FIG. 9, part of the APL 1 is offloaded to the accelerator (acc 1). At this time, the APL 1 (software) and the accelerator (acc 1) operate in a set. Note that the set operation of the APL (software) and the accelerator (acc) is similarly applied to the APL 2 in a right view of FIG. 9.

As indicated by a reference sign f in FIG. 9, the physical server 30 transitions in accordance with an accelerator rewrite instruction (APL 1→APL 2) as follows.

As illustrated in the right view of FIG. 9, the server control apparatus 100 changes the contents of the accelerator (acc 1) into those of the accelerator (acc 2) for the APL 2. That is, because one APL occupies the accelerator (acc), the physical server 30 must change the contents for the accelerator (acc 1) into those of the accelerator (acc 2) for the APL 2.

The following procedures (1) and (2) are performed as procedures for changing the contents of the accelerator (acc 1) to those of the accelerator (acc 2) for the APL 2.

(1) Delete the APL 1 from the physical server 30.
(2) Generate the APL 2 in the physical server 30.

Case of Plurality of APLs Mixedly Present on Physical Server 30

As illustrated in FIG. 1 above, in the server control apparatus 100, the APLs 32 and 33 are connected to the accelerator 35 via the virtual patch panel 34 and the virtual switch (not illustrated). For this connection, the SPP is used, for example.

FIG. 10 is a diagram illustrating the accelerator rewriting method in the case that a plurality of APLs are mixedly present on the physical server 30.

The APL 1 occupies the accelerator 35 via the virtual patch panel 34 as indicated by an allow g in a left view of FIG. 1, and the APL 2 executes the acceleration portion (acc 2) by the software as indicated by an arrow h in the left view of FIG. 10. This connection may be a connection via the virtual patch panel 34 or a direct connection. Alternatively, the acceleration portion (acc 2) may be configured to be contained in the APL 2. In this case, the APL 1 (software) and the acc 1 (FPGA or software; acceleration software) operate in a set. This similarly applies to the APL 2 (software) and the acc2 (FPGA or software; acceleration software).

As indicated by a reference sign i in FIG. 10, the physical server 30 transitions in accordance with an accelerator rewrite instruction (APL 1→APL 2) as follows.

As illustrated in a right view of FIG. 10, the server control apparatus 100 changes the contents of the accelerator (acc 1) into those of the accelerator (acc 2) for the APL 2.

The following procedures (3), (4), and (5) are performed as procedures for changing the contents of the accelerator (acc 1) to those of the accelerator (acc 2) for the APL 2.

(3) Generate the acceleration portion (acc 1) of the APL 1 (see an arrow j in the right view of FIG. 10).
(4) Delete the acceleration portion (acc 2) of the APL 2.
(5) Switch a path of the virtual patch panel 34 such that the APL 2 occupies the accelerator (acc 2) (see an arrow k in the right of FIG. 10).

Operation Image

FIGS. 11A to 11D are diagrams illustrating offloading in a case that connection with an FPGA is required for an APL of the server control apparatus 100. Note that FIGS. 11A to 11D correspond to FIGS. 18A to 18D for the related art.

Physical servers 30-1 to 30-4 illustrated in FIGS. 11A to 11D, in which connection with the FPGA is required for the APL, offload a certain APL into the FPGA, while no other APL is put thereon.

Figure 11A:
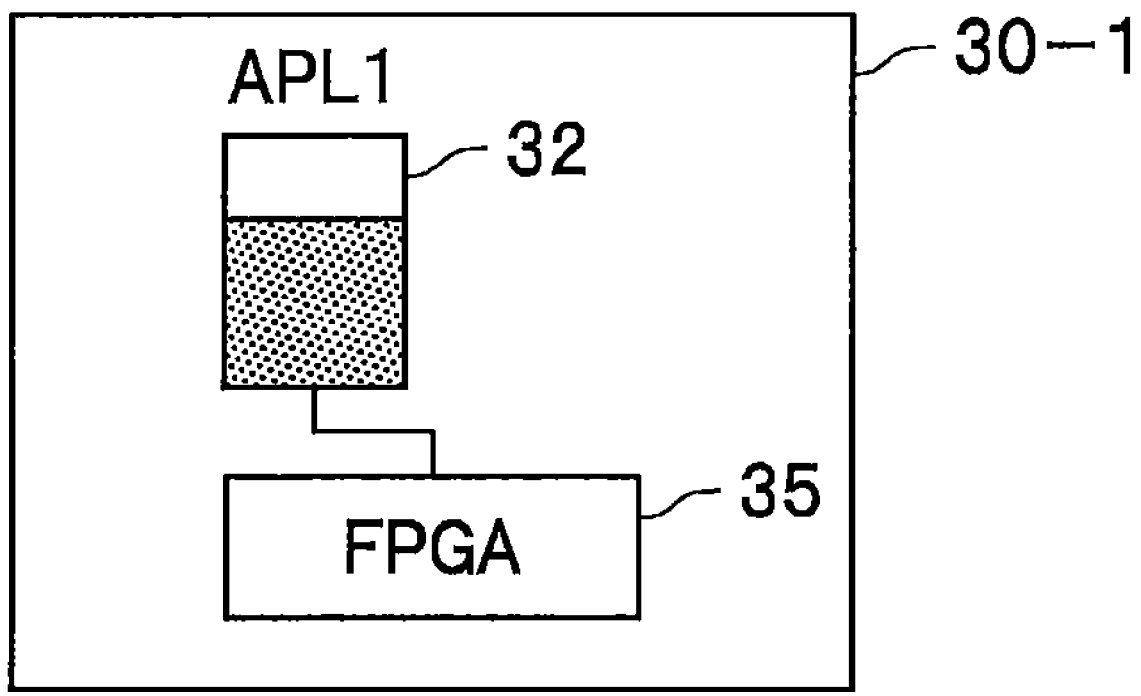
FIG. 11A is a diagram illustrating offloading in a case that connection with an FPGA is required for an APL of the server control apparatus according to the present embodiment.
Figure 11B:
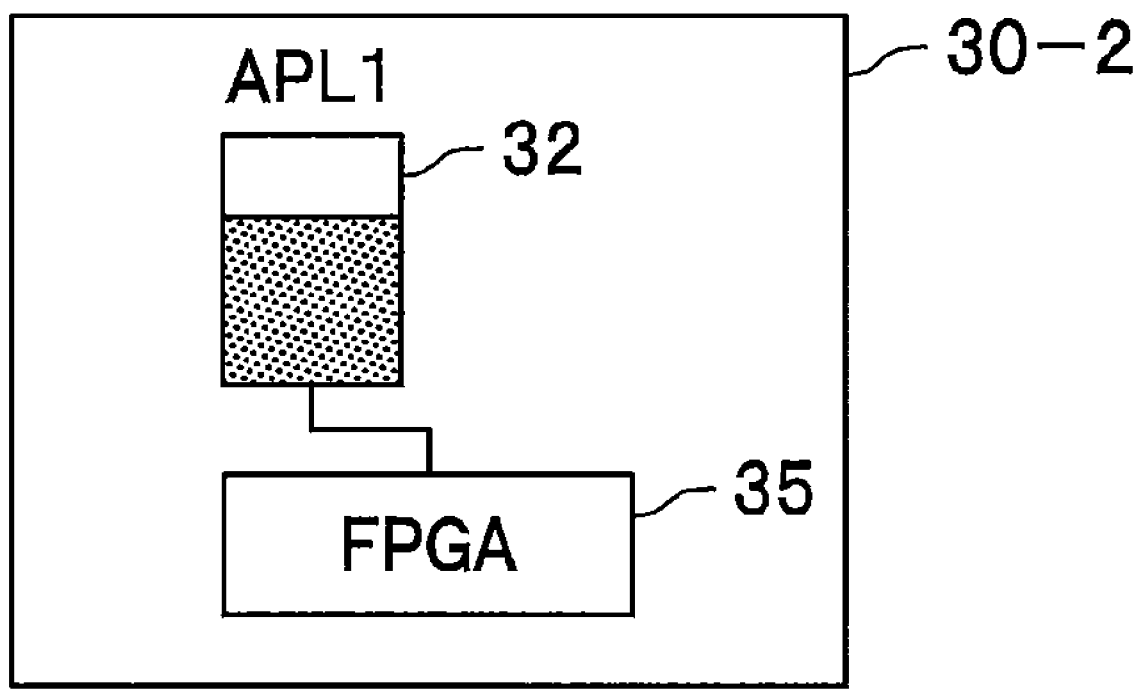
FIG. 11B is a diagram illustrating offloading in the case that connection with an FPGA is required for an APL of the server control apparatus according to the present embodiment.
Figure 11C:
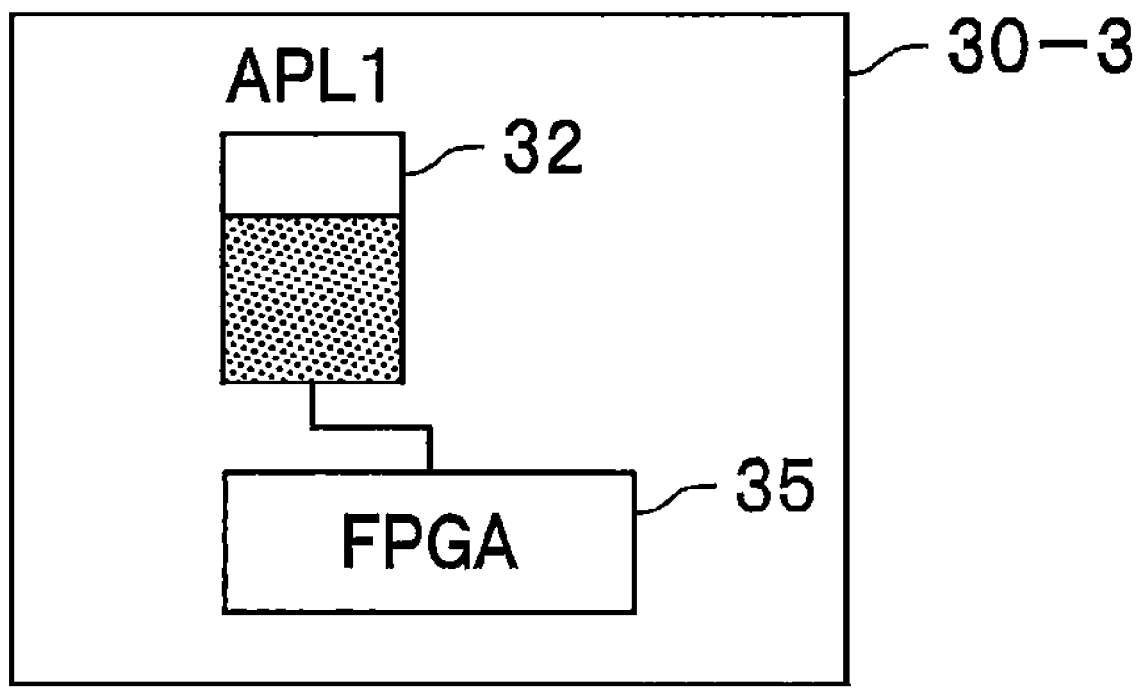
FIG. 11C is a diagram illustrating offloading in the case that connection with an FPGA is required for an APL of the server control apparatus according to the present embodiment.
Figure 11D:
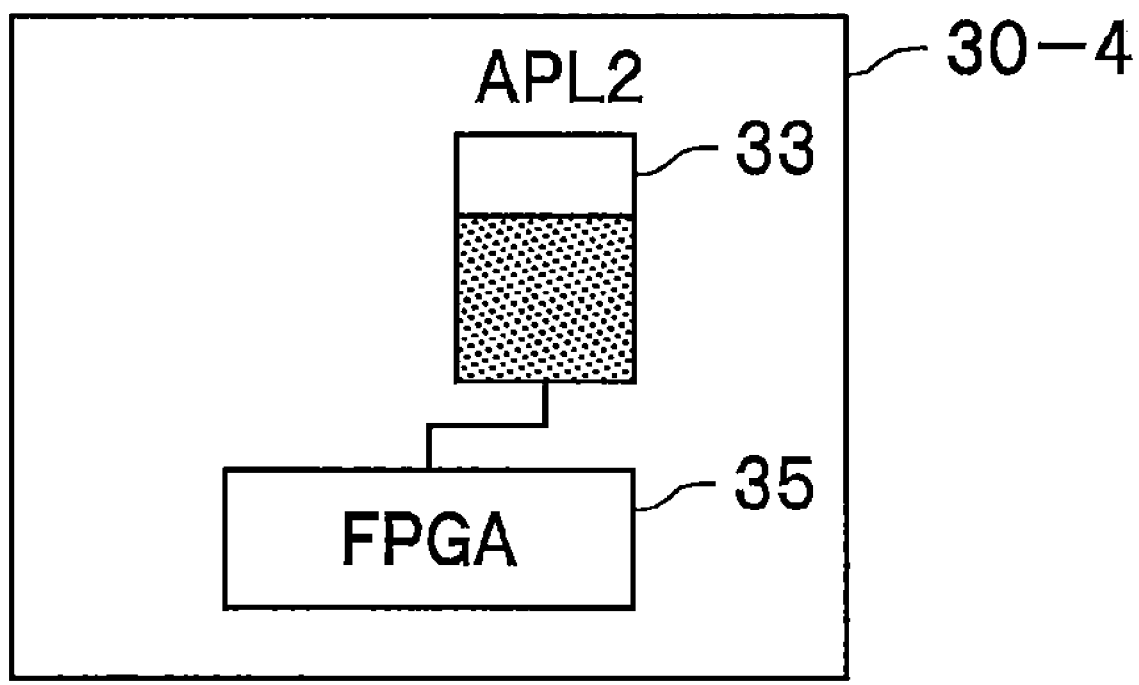
FIG. 11D is a diagram illustrating offloading in the case that connection with an FPGA is required for an APL of the server control apparatus according to the present embodiment.
Figure 12A:
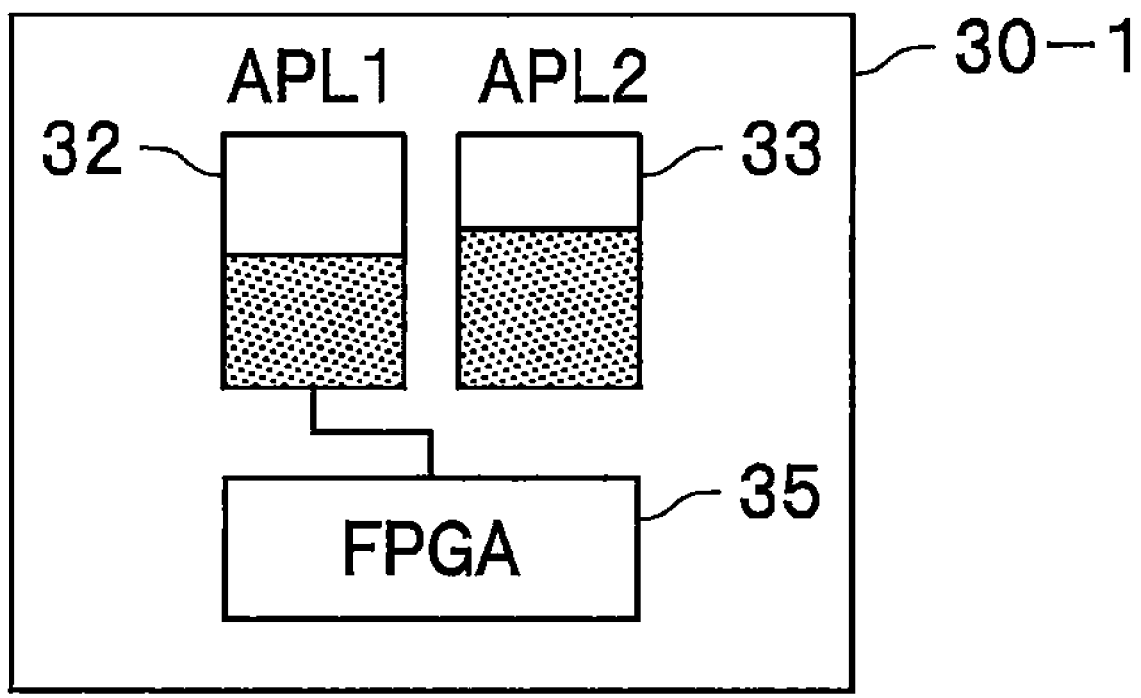
FIG. 12A is a diagram illustrating offloading in a case that connection with an FPGA is optional for an APL of the server control apparatus according to the present embodiment.
Figure 12B:
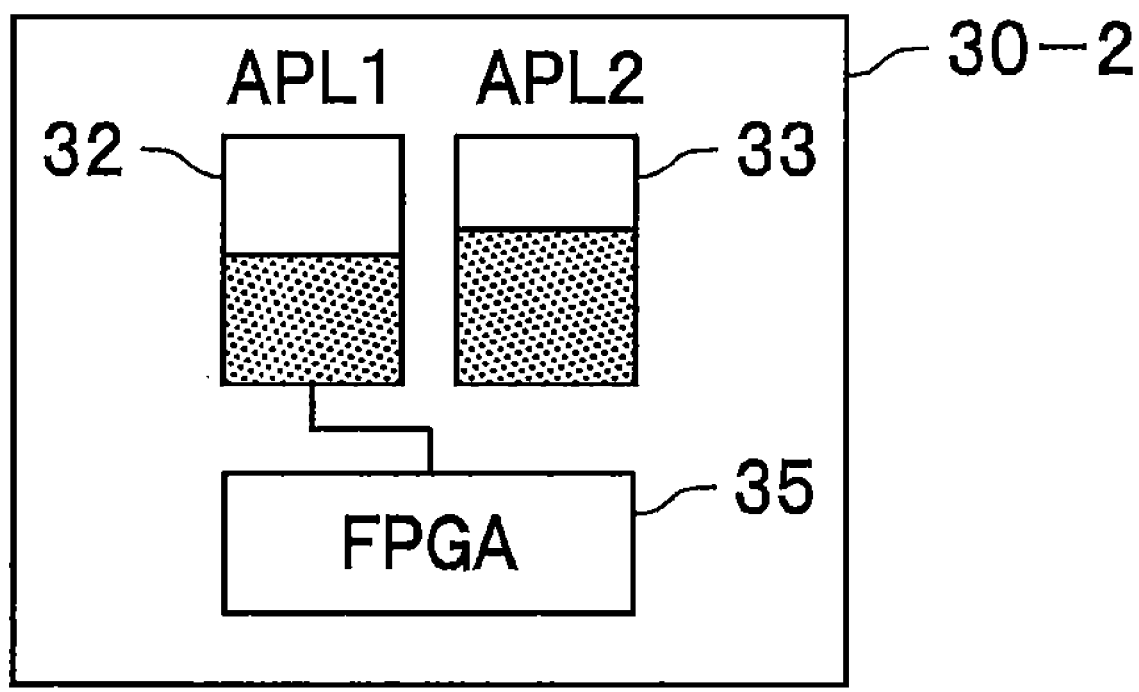
FIG. 12B is a diagram illustrating offloading in the case that connection with an FPGA is optional for an APL of the server control apparatus according to the present embodiment.
Figure 12C:
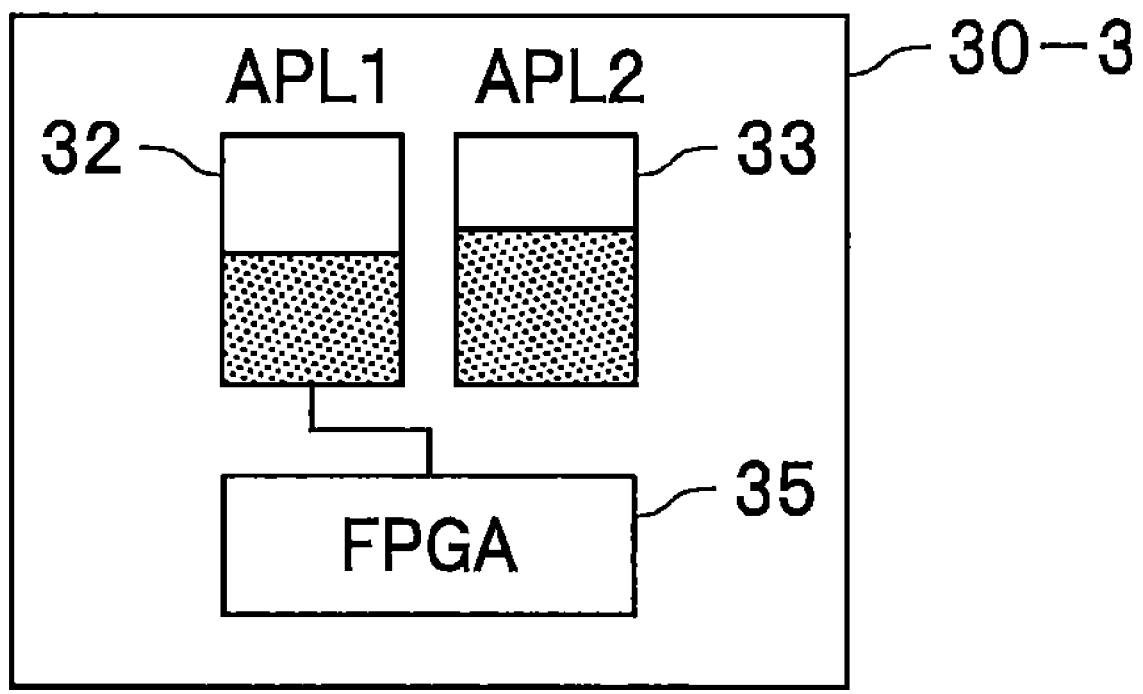
FIG. 12C is a diagram illustrating offloading in the case that connection with an FPGA is optional for an APL of the server control apparatus according to the present embodiment.
Figure 12D:
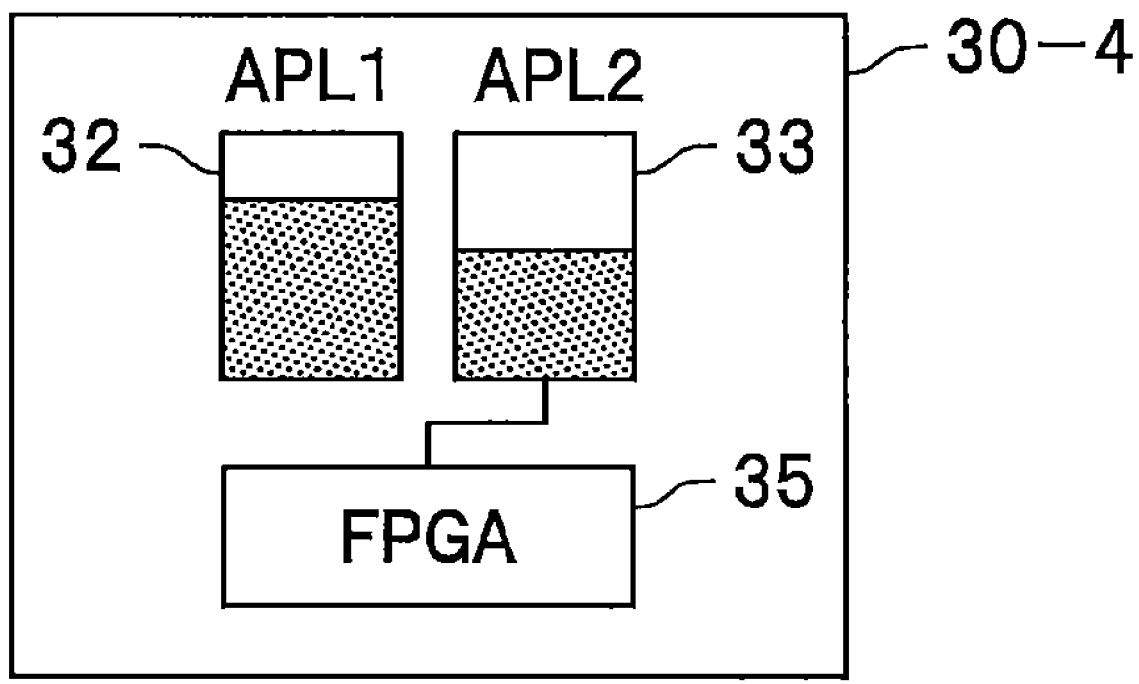
FIG. 12D is a diagram illustrating offloading in the case that connection with an FPGA is optional for an APL of the server control apparatus according to the present embodiment.

Since the relatively more FPGAs are allocated for the APL 2, the server control apparatus 100 applies the APL 2 only to the physical server 30-4 illustrated in FIG. 11D among the four physical servers 30-1 to 30-4, and applies the APL 1 to the three remaining physical servers 30-1 to 30-3 (see FIGS. 11A to 11 C).

Figure 18A:
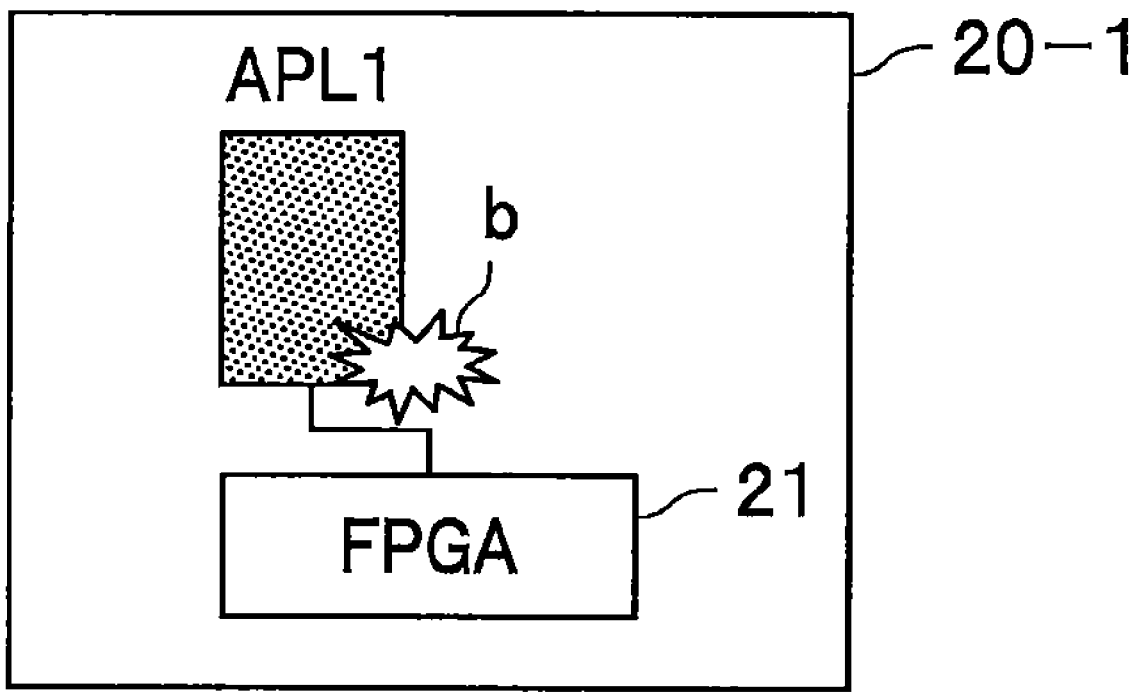
FIG. 18A is a diagram illustrating offloading in a case that connection with an FPGA is required for an APL.
Figure 18B:
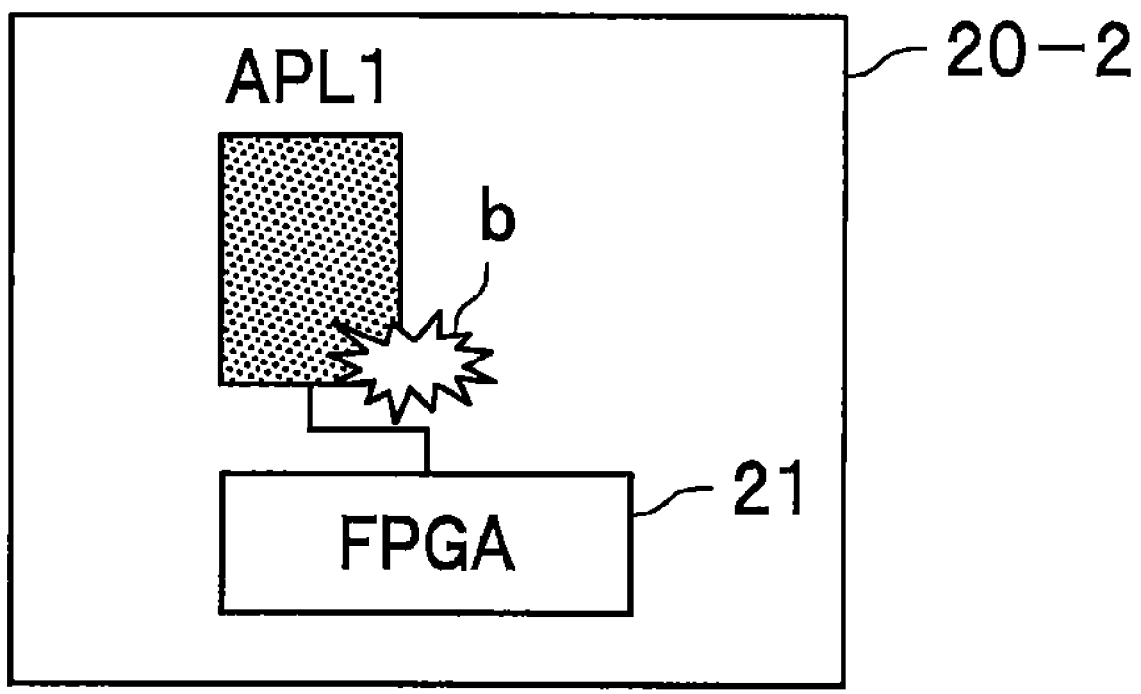
FIG. 18B is a diagram illustrating offloading in the case that connection with an FPGA is required for an APL.
Figure 18C:
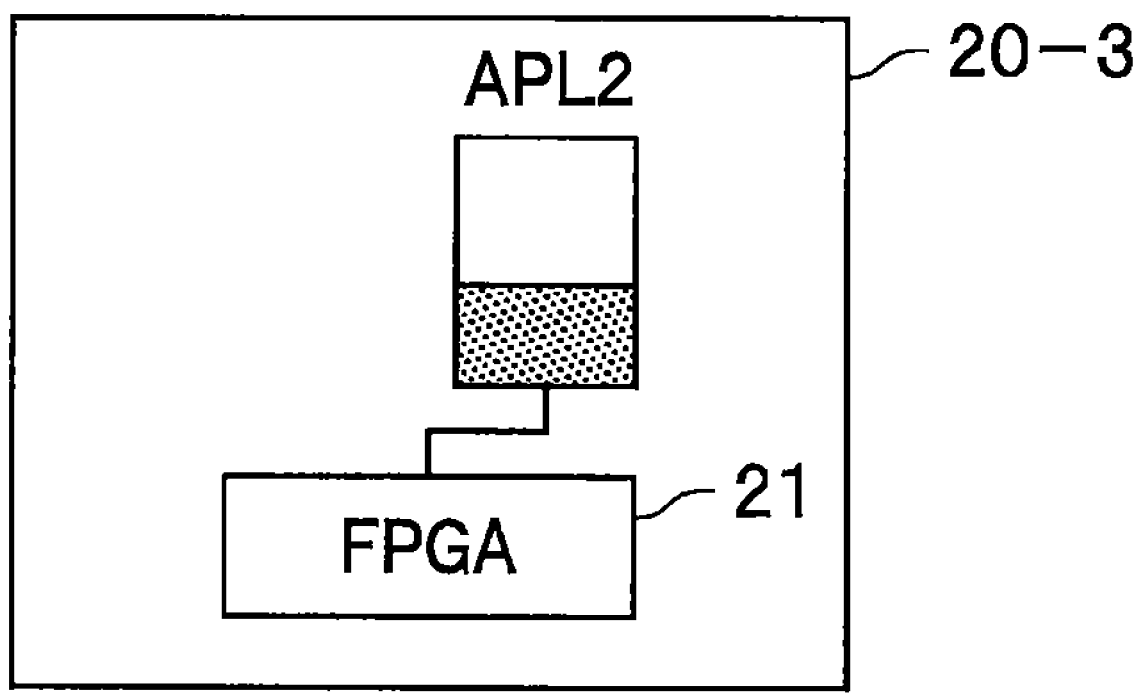
FIG. 18C is a diagram illustrating offloading in the case that connection with an FPGA is required for an APL.
Figure 18D:
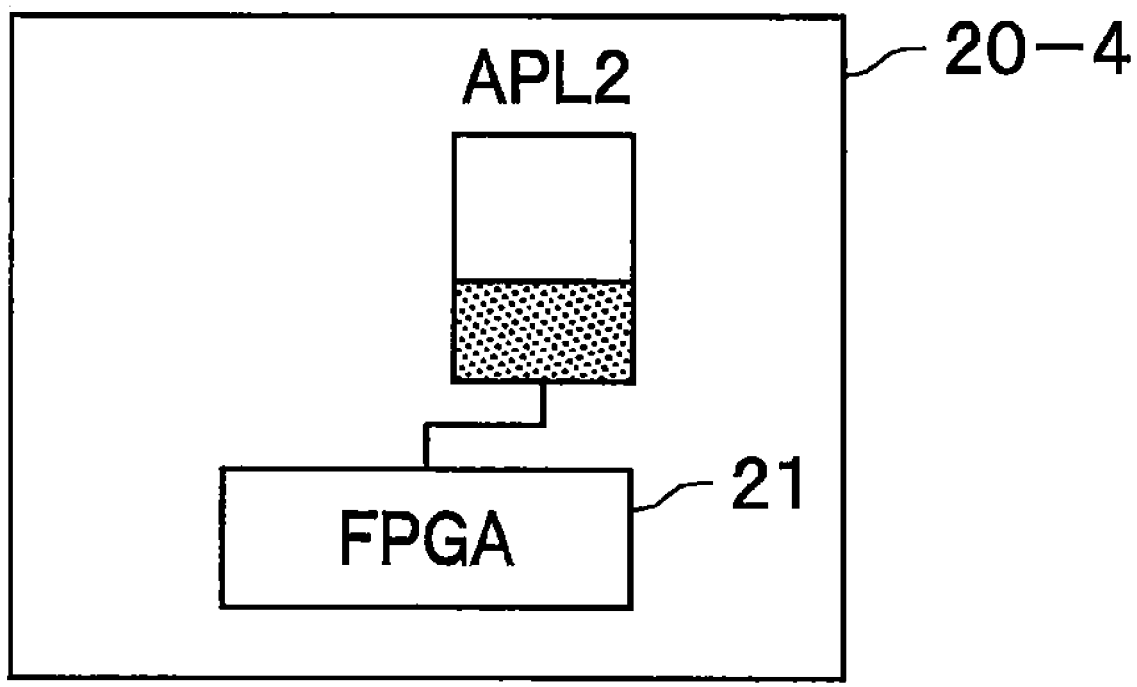
FIG. 18D is a diagram illustrating offloading in the case that connection with an FPGA is required for an APL.
Figure 19A:
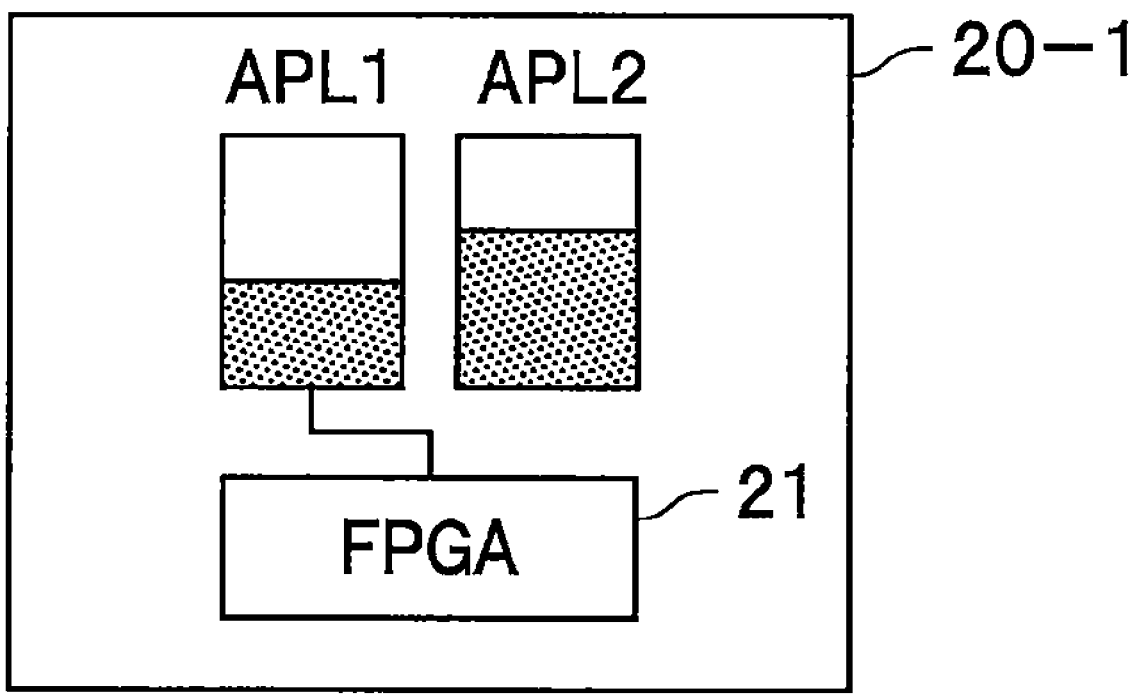
FIG. 19A is a diagram illustrating offloading in a case that connection with an FPGA is optional for an APL.
Figure 19B:
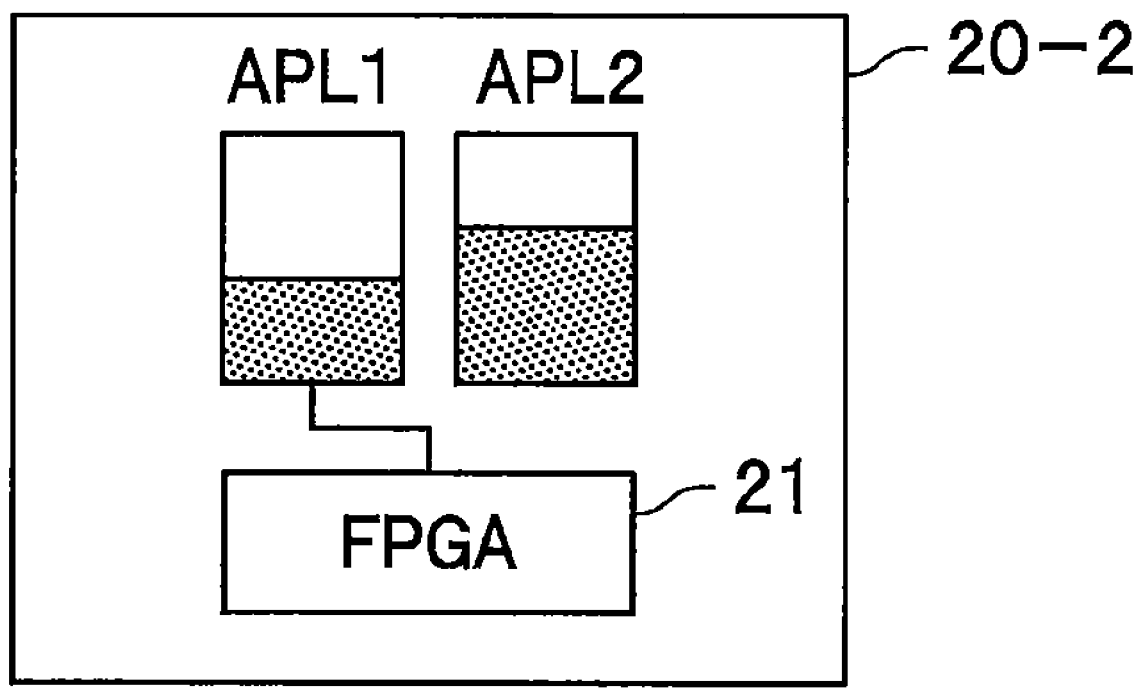
FIG. 19B is a diagram illustrating offloading in the case that connection with an FPGA is optional for an APL.
Figure 19C:
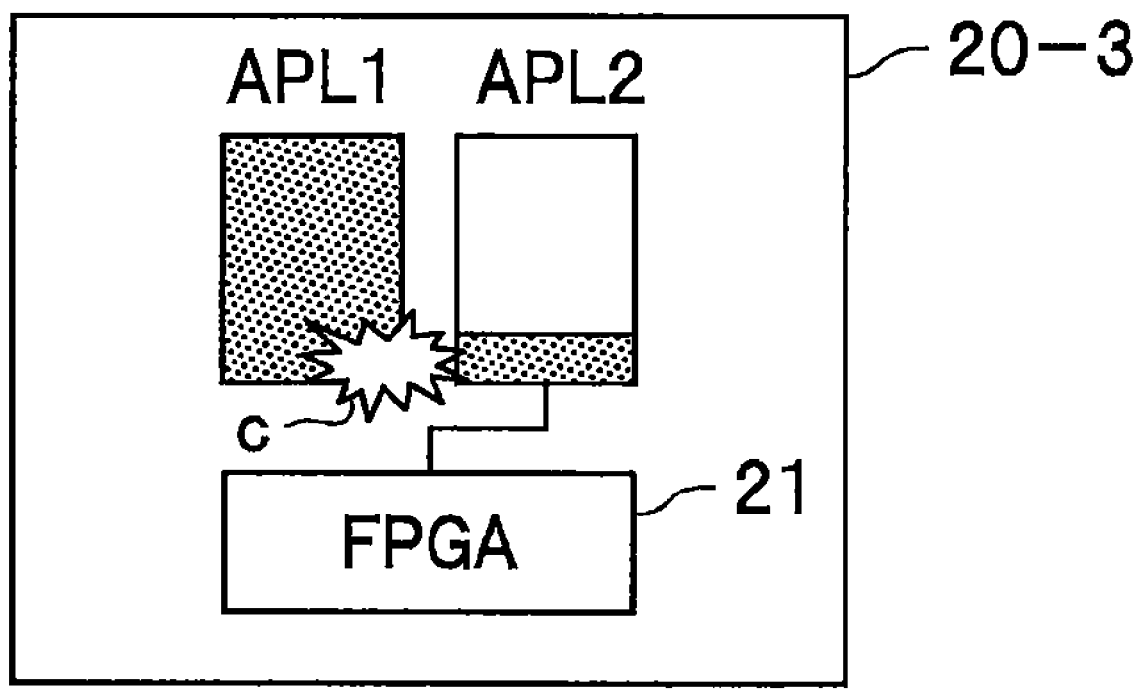
FIG. 19C is a diagram illustrating offloading in the case that connection with an FPGA is optional for an APL.
Figure 19D:
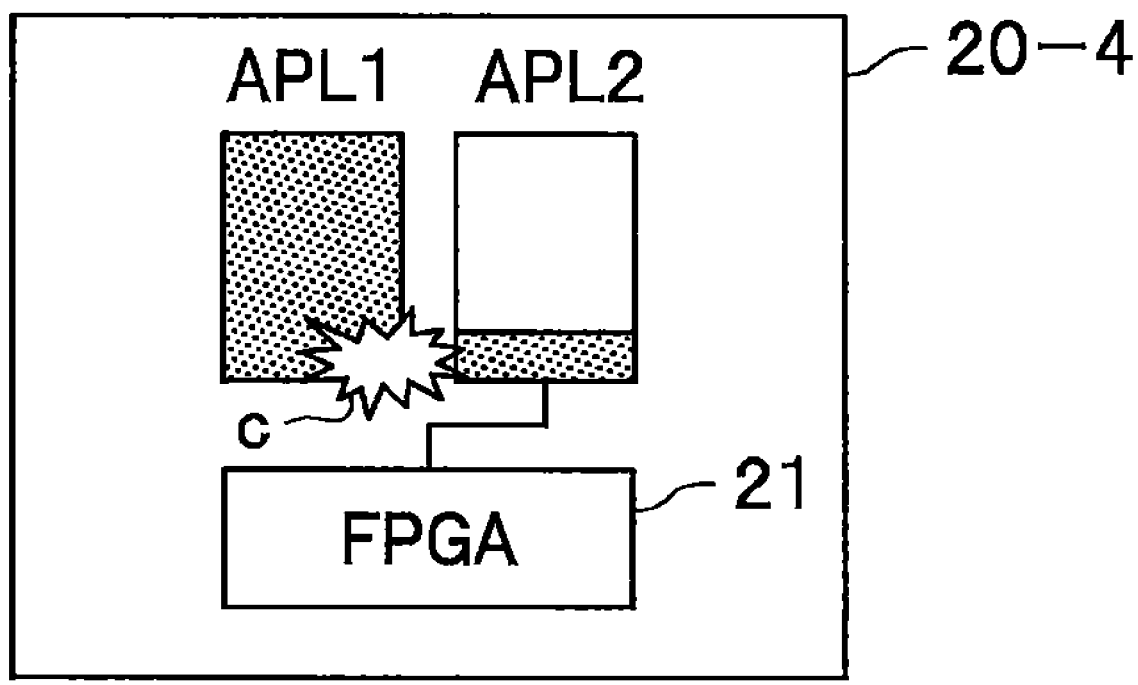
FIG. 19D is a diagram illustrating offloading in the case that connection with an FPGA is optional for an APL.

As compared to FIGS. 18A to 18D for the related art described above, in the related art, in the servers 20-1 and 20-2 illustrated in FIGS. 18A and 18B, the connection with the FPGA 35 is required for the APL 1, and in the servers 20-3 and 20-4 illustrated in FIGS. 18C and 18D, the connection with the FPGA 21 is required for the APL 2. In contrast, the server control apparatus 100 allocates more accelerators for the APL with relatively more requests, although the FPGA connection is required for the APL. This allows the server control apparatus 100 to effectively utilize the accelerator to achieve the improvement in the throughput and availability of the overall cluster.

FIGS. 12A to 12D are diagrams illustrating offloading in a case that connection with an FPGA is optional for an APL. Note that FIGS. 12A to 12D correspond to FIGS. 19A to 19D for the related art described above.

In the physical servers 30-1 to 30-4 illustrated in FIGS. 12A to 12D, connection with an FPGA is optional for an APL.

Because the connection with the FPGA is optional for the APL, the server control apparatus 100 can offload a certain APL into the FPGA and also put another APL on the FPGA. Since the relatively more FPGAs are allocated for the APL 2, the server control apparatus 100 connects, to the APL 2, only the FPGA 35 in the physical server 30-4 illustrated in FIG. 11D among the four physical servers 30-1 to 30-4, and the FPGAs 35 of the three remaining physical servers 30-1 to 30-3 connect to the APL 1 (see FIG. 12A to FIG. 12C).

In this manner, the APL 1 is offloaded into the FPGAs 35 in the physical servers 30-1 to 30-3, and so, in the physical servers 30-1 to 30-4, none of the APL 1 and APL 2 reaches the APL limit. In this way, in the case that the FPGA connection is optional for the APL, the server control apparatus 100 can effectively utilize its function so as to allocate more accelerators for the APL with relatively more requests to improve the throughput of the overall cluster.

Control Sequence

Figure 13:
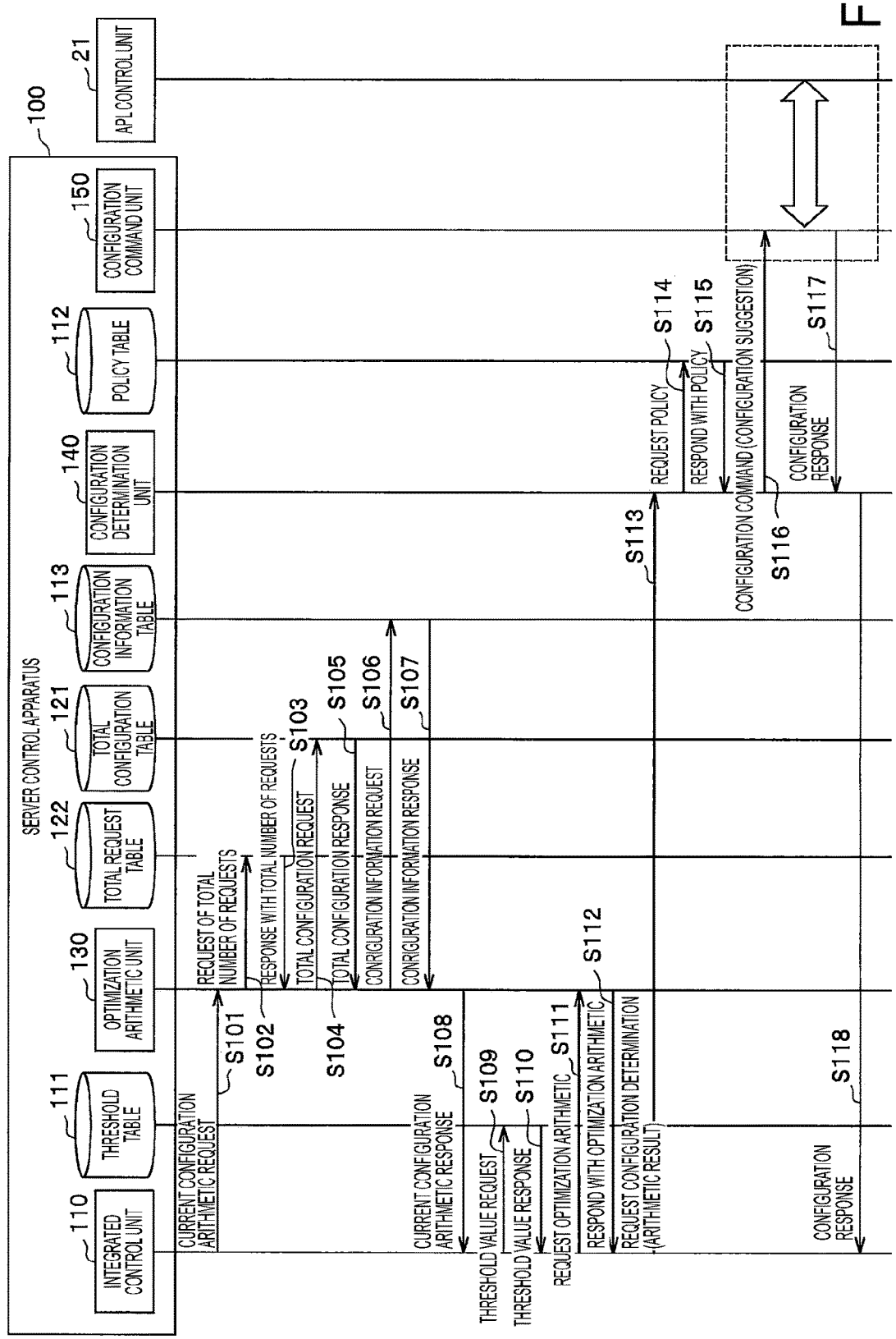
FIG. 13 is a control sequence diagram for a network system including a server and the server control apparatus according to the present embodiment.
Figure 14:
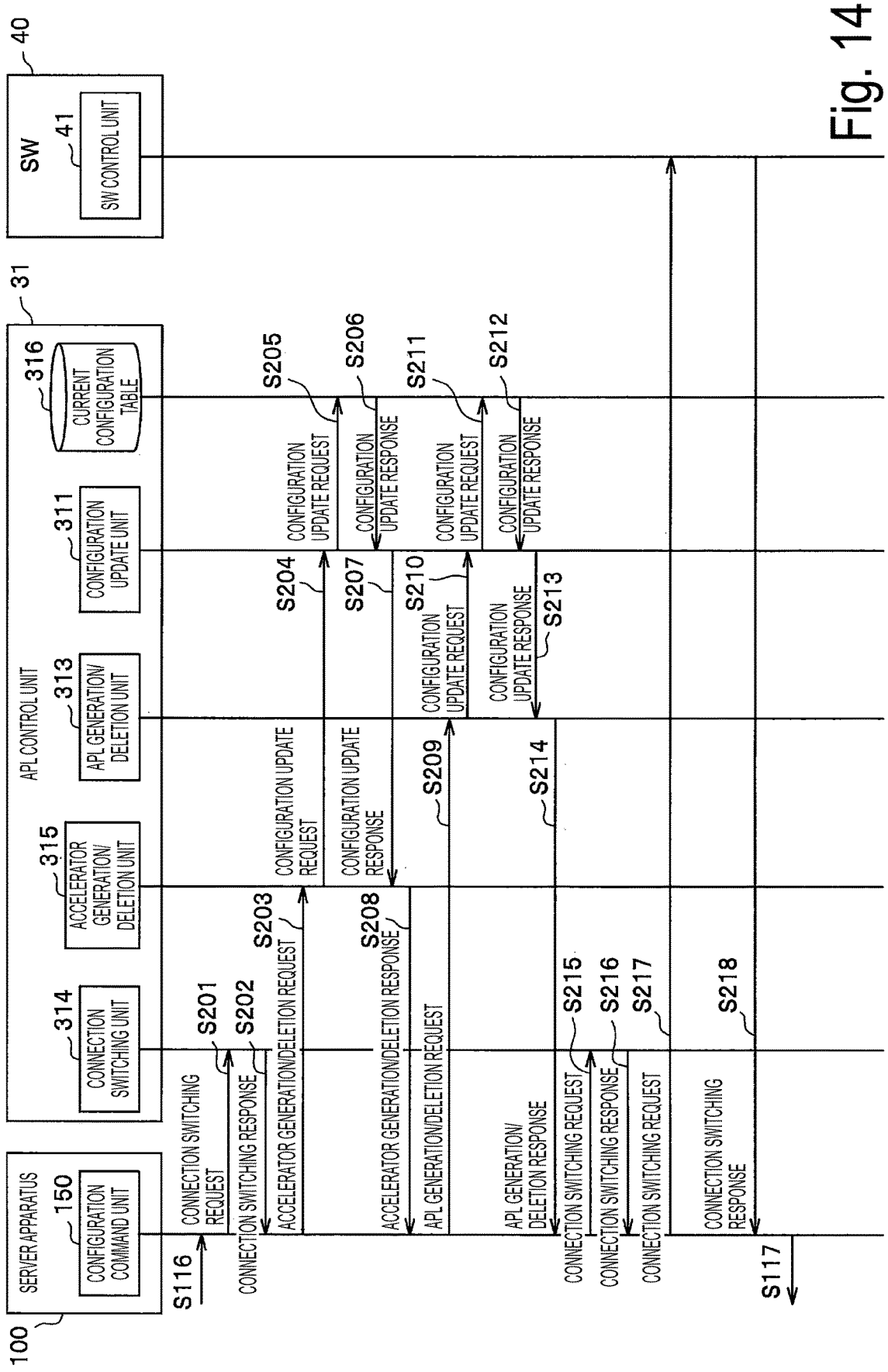
FIG. 14 is a control sequence diagram for the network system including the server and the server control apparatus according to the present embodiment.

FIGS. 13 and 14 are control sequence diagrams for the network system 1 including the server 30 and the server control apparatus 100. FIG. 13 mainly illustrates a control sequence of each of the units in the server control apparatus 100, and FIG. 14 illustrates a control sequence of each of the units in the APL control unit 31, subsequent to FIG. 13.

As illustrated in FIG. 13, the integrated control unit 110 (see FIG. 2) requests current configuration arithmetic from the optimization arithmetic unit 130 (see FIG. 2) (step S101).

The optimization arithmetic unit 130 requests the total number of requests from the total request table 122 (see FIG. 7) (step S102).

The total request table 122 responds with the total number of requests to the optimization arithmetic unit 130 (step S103).

The optimization arithmetic unit 130 requests the total configurations from the total configuration table 121 (see FIG. 6) (step S104).

The total configuration table 121 responds with the overall configurations to the optimization arithmetic unit 130 (step S105).

The optimization arithmetic unit 130 requests configuration information from the configuration information table 113 (see FIG. 5) (step S106).

The configuration information table 113 responds with the configuration information to the optimization arithmetic unit 130 (step S107).

The optimization arithmetic unit 130 responds with the current configuration arithmetic to the integrated control unit 110 (step S108).

The integrated control unit 110 requests a threshold from the threshold table 111 (see FIG. 3) (step S109).

The threshold table 111 responds with the threshold to the integrated control unit 110 (step S110).

The integrated control unit 110 requests optimization arithmetic from the optimization arithmetic unit 130 (step S111).

The optimization arithmetic unit 130 responds with the optimization arithmetic to the integrated control unit 110 (step S112).

The integrated control unit 110 requests configuration determination (arithmetic result) from the configuration determination unit 140 (step S113).
The configuration determination unit 140 requests a policy from the policy table 112 (see FIG. 4) (step S114).
The policy table 112 responds with the policy to the configuration determination unit 140 (step S115).
The configuration determination unit 140 commands the configuration (transmits the configuration suggestions) to the configuration command unit 150 (step S116).
The configuration command unit 150 responds with the configuration to the configuration determination unit 140 (step S117).
The configuration determination unit 140 responds with the configuration to the integrated control unit 110 (step S118). The control sequence in the server control apparatus 100 ends, here.

As illustrated in FIG. 14, the configuration command unit 150 in the server control apparatus 100 (see FIG. 2), on receiving the configuration command from the configuration determination unit 140 (step S116), requests connection switching from the connection switching unit 314 in the APL control unit 31 (see FIG. 2) (step S201).
The connection switching unit 314 responds with the connection switching to the configuration command unit 150 (step S202).
The configuration command unit 150 requests accelerator generation/deletion from the accelerator generation/deletion unit 315 (step S203).
The accelerator generation/deletion unit 315 requests configuration update from the configuration update unit 311 (step S204).
The configuration update unit 311 requests the configuration update from the current configuration table 316 (step S205).
The current configuration table 316 responds with the configuration update to the configuration update unit 311 (step S206).
The configuration update unit 311 responds with the configuration update to the accelerator generation/deletion unit 315 (step S207).
The accelerator generation/deletion unit 315 responds with the accelerator generation/deletion to the configuration command unit 150 (step S208).
The configuration command unit 150 requests APL generation/deletion from the APL generation/deletion unit 313 (step S209).
The APL generation/deletion unit 313 requests from configuration update of the configuration update unit 311 (step S210).
The configuration update unit 311 requests from the configuration update of the current configuration table 316 (step S211).
The current configuration table 316 responds with the configuration update to the configuration update unit 311 (step S212).
The configuration update unit 311 responds with the configuration update to the APL generation/deletion unit 313 (step S213).
The APL generation/deletion unit 313 responds with the APL generation/deletion to the configuration command unit 150 (step S214).
The configuration command unit 150 requests connection switching from the connection switching unit 314 (step S215).
The connection switching unit 314 responds with the connection switching to the configuration command unit 150 (step S216).

The configuration command unit 150 requests connection switching from the SW control unit 41 in the SW 40 (see FIG. 2) (step S217).
The SW control unit 41 responds with the connection switching to the configuration command unit 150 (step S217).
The configuration command unit 150 responds with the configuration to the configuration determination unit 140 (see FIG. 13) (step S117).
Flowchart
FIG. 15 is a flowchart illustrating the server control method for the server control apparatus 100. In step S11, the integrated control unit 110 (see FIG. 2) issues a current configuration arithmetic request to each of the units periodically or through an instruction by an operator.
In step S12, the optimization arithmetic unit 130 (see FIG. 2) acquires all the requests from the total request table 122, acquires all the configurations from the total configuration table 121, and acquires the configuration information from the configuration information table 113.
In step S13, the optimization arithmetic unit 130 calculates a performance-to-request ratio for a current allocation of the accelerator ("current configuration arithmetic processing").
A performance-to-request ratio of an APL i is described. The optimization arithmetic unit 130 calculates the performance-to-request ratio for the current allocation of the accelerator in accordance with Equation (2) expressed by δ-functions.

[Math. 1]

$$\left(\frac{P}{R}\right)_i = \left(\sum_j P_i \delta^F_{ij} + \sum_j p_i \delta^S_{ij}\right) / R_i \qquad (2)$$

$\delta^F_{ij}$ IS 1 IF THE APL i USING AN ACCELERATOR IS

PRESENT ON THE SERVER j, OR 0 IF NOT PRESENT $\delta^S_{ij}$ IS 1 IF THE APL i NOT USING AN ACCELERATOR IS PRESENT ON THE SERVER j, OR 0 IF NOT PRESENT In a case that the APL i in a state of either using or not using the FPGA is located on each of all the servers, Equation (2) above is simplified to Equation (3).

[Math. 2]

$$\left(\frac{P}{R}\right)_i = (N_i P_i + (N - N_i) p_i) / R_i \qquad (3)$$

N REPRESENTS THE NUMBER OF SERVERS

Ni REPRESENTS THE NUMBER OF SERVERS

IN WHICH THE APL i IS USING AN ACCELERATOR

An FPGA capacity condition on the server and a software capacity condition on the server are described.
The FPGA capacity condition on the server j is expressed by Relationship (4). Relationship (4) expresses a condition that an FPGA capacity (Sj) on a server j is not exceeded.
The software capacity condition on the server j is expressed by Relationship (5). Relationship (5) expresses a condition that a software capacity (sj) on the server j is not exceeded.

[Math. 3]

$$\sum_i C_i \delta_{ij}^F \leq S_j \quad (4)$$

A CONDITION THAT THE ACCELERATOR

CAPACITY ($Sj$) ON THE SERVER $j$ IS NOT EXCEEDED $$\sum_i c_i \delta_{ij}^S \leq s_j \quad (5)$$

A CONDITION THAT THE SOFTWARE

CAPACITY ($sj$) ON THE SERVER $j$ IS NOT EXCEEDED

The FPGA capacity condition on the server j (refer to Relationship (4)) and the software capacity condition on the server j (refer to Relationship (5)) are the conditions that are prioritized over the performance-to-request ratio of the APL i described above and an optimization condition described later.

Returning to the flowchart in FIG. 15, in step S14, the integrated control unit 110 acquires a threshold from the threshold table 111.

In step S15, the integrated control unit 110 determines whether or not the arithmetic result in step S13 described above has a deviation equal to or greater than the threshold of the threshold table 111 (e.g., whether the arithmetic result is equal to or greater than the threshold).

In a case that the arithmetic result has a deviation equal to or greater than the threshold of the threshold table 111 (step S15: Yes), the process of the server control apparatus 100 proceeds to step S16, and in a case that the arithmetic result does not have a deviation equal to or greater than the threshold of the threshold table 111 (step S15: No), the process proceeds to step S23.

In step S16, the optimization arithmetic unit 130 performs the optimization arithmetic on the allocation of the accelerator by using the processing capability of the optimization arithmetic unit 130 itself or the processing capability of the external calculator 71 (see FIG. 2) ("optimization arithmetic processing").

The optimization condition for the allocation of the accelerator is described.

The optimization condition for the allocation of the accelerator is expressed by the expression (6). The expression (6) expresses a condition for minimizing divergence of the performance-to-request ratio of the APL i.

[Math. 4]

$$\min\left(div\left(\frac{P}{R}\right)_i\right) \quad (6)$$

A CONDITION THAT MINIMIZES THE

PERFORMANCE-TO-REQUEST RATIO OF THE $APL\ i$

In addition, in a case that the arithmetic results are included in the external DB 72 (see FIG. 2), the optimization arithmetic unit 130 may refer to the arithmetic results in the external DB 72.

In step S17, the configuration determination unit 140 (see FIG. 2) acquires a policy from the policy table 112.

In step S18, the configuration determination unit 140 uses the arithmetic result received from the integrated control unit 110 and the acquired policy to determine a configuration suggestion to be taken next ("configuration suggestion create processing").

Hereinafter, a portion surrounded by dashed lines in FIG. 15 indicates steps performed for each of the APL control units 31 of the physical servers 30 (see FIG. 2).

In step S19, the connection switching unit 314 in the physical server 30 (see FIG. 2) releases the connection between the accelerator and the APL, based on a request from the configuration command unit 150 in the server control apparatus 100.

In step S20, the accelerator generation/deletion unit 315 in the APL control unit 31 (see FIG. 2) rewrites the contents of the accelerator, based on a request from the configuration command unit 150 in the server control apparatus 100.

In step S21, the APL generation/deletion unit 313 in the APL control unit 31 (see FIG. 2) replaces the APL, based on a request from the configuration command unit 150 in the server control apparatus 100. At this time, the APL separated from the accelerator and remaining on the physical server 30 creates corresponding acceleration software (see the acc 1 and the acc 2 in FIG. 10). The APL that is already present on the physical server 30 and newly connects to the accelerator deletes the corresponding acceleration software.

In step S22, the connection switching unit 314 in the APL control unit 31 (see FIG. 2) newly connects the accelerator with the APL, based on a request from the configuration command unit 150 in the server control apparatus 100.

In step S23, the SW control unit 41 in the SW 40 (see FIG. 1) updates a switching destination of the SW 40, based on a request from the configuration command unit 150 in the server control apparatus 100, and then, this processing ends.

Hardware Configuration

Figure 16:
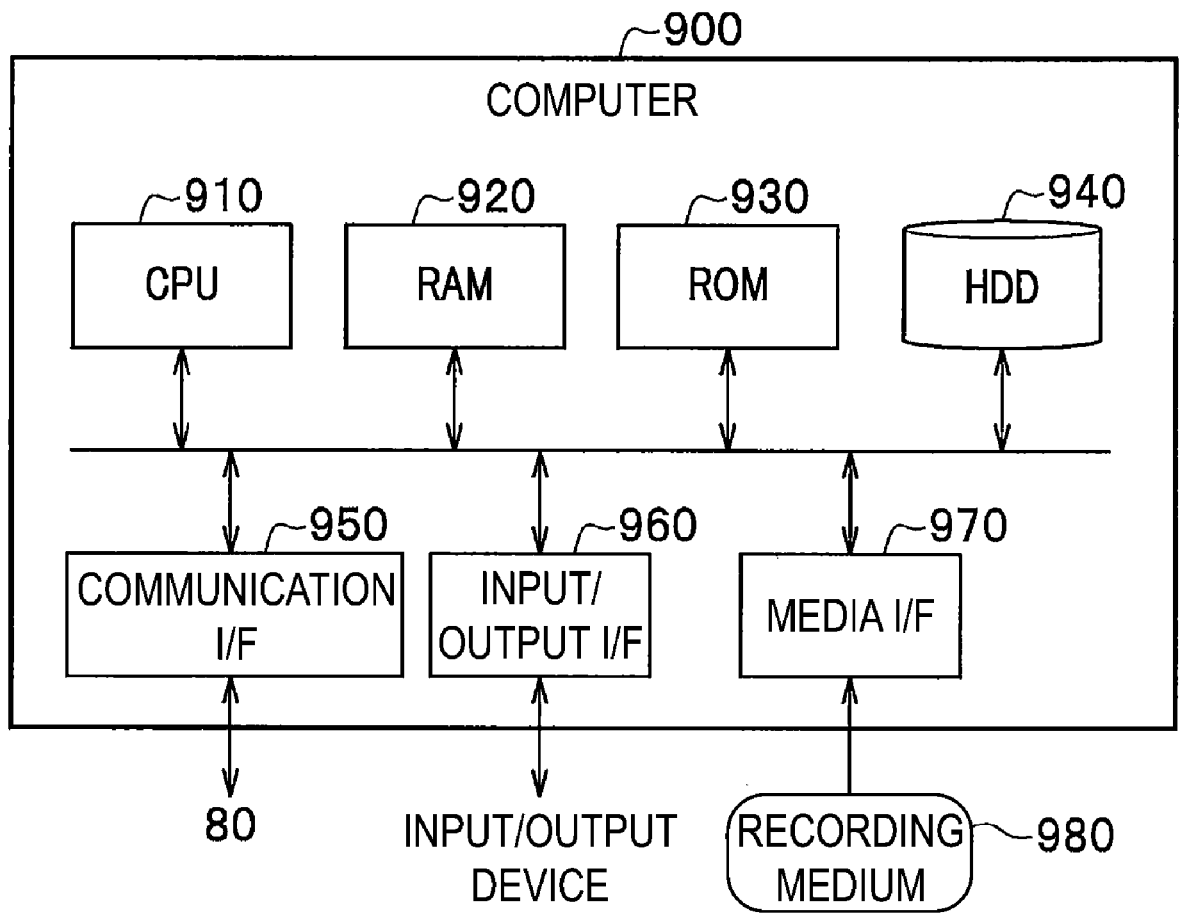
FIG. 16 is a hardware configuration diagram illustrating an example of a computer that implements functions of the server control apparatus according to the present embodiment.
Figure 17:
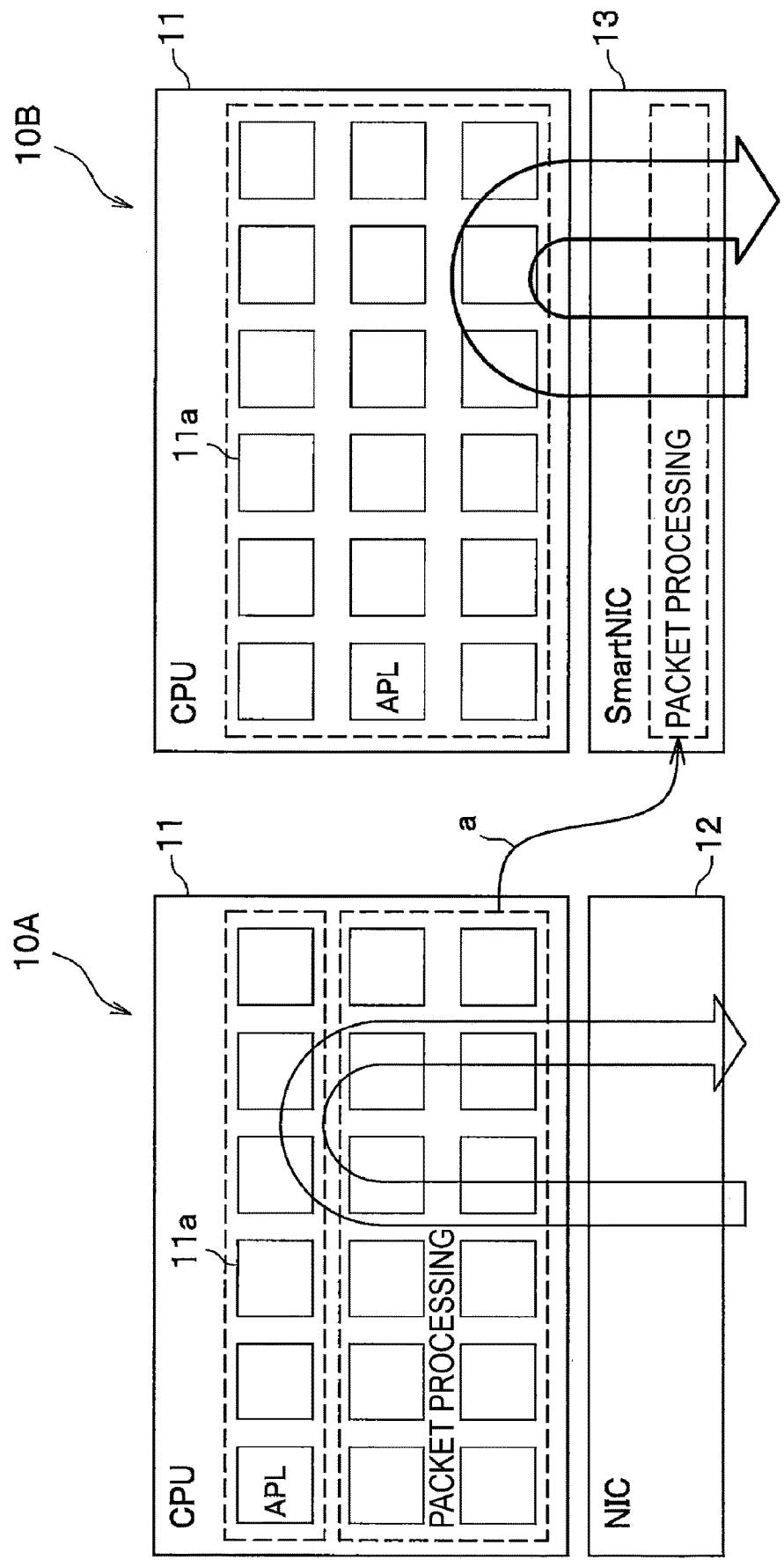
FIG. 17 is a schematic configuration diagram of an arithmetic system in which an arithmetic device dedicated to certain processing is added to a general purpose computer.

The server control apparatus 100 according to the present embodiment is realized by a computer 900 configured as illustrated in FIG. 16, for example. Hereinafter, the server control apparatus 100 will be described as an example. FIG. 16 is a hardware configuration diagram illustrating an example of the computer 900 that implements functions of the server control apparatus 100.

The computer 900 includes a CPU 910, a RAM 920, a ROM 930, an HDD 940, a communication interface (I/F: Interface) 950, an input/output interface (I/F) 960, and a media interface (I/F) 970.

The CPU 910 operates based on programs stored in the ROM 930 or the HDD 940, and performs control of each unit. The ROM 930 stores a boot program executed by the CPU 910 when the computer 900 is activated, a program dependent on the hardware of the computer 900, and the like.

The HDD 940 stores programs executed by the CPU 910, data used by such programs, and the like. The HDD 940 may store, for example, the threshold table 111, the policy table 112, and the configuration information table 113 (see FIG. 2). The communication interface 950 receives data from other devices via a communication network 80 and transmits the received data to the CPU 910, and transmits data generated by the CPU 910 to other devices via the communication network 80.

The CPU 910 controls, via the input/output interface 960, an output device such as a display and a printer, and an input device such as a keyboard and a mouse. The CPU 910 acquires data from the input device via the input/output interface 960. The CPU 910 also outputs the generated data to the output device via the input/output interface 960.

The media interface 970 reads the program or data stored in a recording medium 980 and provides the read program to the CPU 910 via the RAM 920. The CPU 910 loads such programs from the recording medium 980 onto the RAM 920 via the media interface 970 to execute the loaded programs. The recording medium 980 is, for example, an optical recording medium such as a Digital Versatile Disc (DVD) and a Phasechangerewritable Disk (PD), a magneto-optical recording medium such as a Magneto Optical disk (MO), a tape medium, a magnetic recording medium, a semiconductor memory, or the like.

For example, in a case that the computer 900 functions as the server control apparatus 100 according to the present embodiment, the CPU 910 in the computer 900 implements the functions of the respective units of the server control apparatus 100 by executing the programs loaded on the RAM 920. In addition, the HDD 940 stores therein data of the respective units in the server control apparatus 100. The CPU 910 in the computer 900 reads and executes these programs from the recording medium 980, but may acquire these programs from other devices via the communication network 80, as another example.

Advantages

As described above, the server control apparatus 100 includes a request and configuration collection unit 120 that acquires a request to offload a certain process of an application to an accelerator for each application in a server, and configurations of the accelerator and the application in a server 30, an optimization arithmetic unit 130 that determines, by referring to information of the acquired request and configurations of the physical server 30, a ratio of processing performance to the request, and optimizes allocation of the accelerator so that variance of the ratio between the applications is equal to or less than a predetermined threshold, and a configuration determination unit 140 that determines a configuration suggestion to be taken by the physical server 30 by using an arithmetic result from the optimization arithmetic unit 130 and a predetermined policy, and commands the physical server 30 to execute the configuration suggestion.

This can improve the throughput and availability of the server to which the accelerator is applied.

The server control apparatus 100 further includes a threshold table 111 that includes at least one of a divergence of the ratio, a minimum value of the ratio, or a maximum value of the ratio as a parameter of the ratio, and holds a threshold for applying the parameter, wherein the optimization arithmetic unit 130 performs optimization arithmetic by using the threshold for the parameter.

This allows combination of the parameters to be used to select and perform the more appropriate optimization arithmetic for cluster situations.

In the server control apparatus 100, the optimization arithmetic unit 130 performs arithmetic of the ratio in accordance with Equation (2) above.

This makes it possible to calculate a performance ratio to request for each APL, and calculate an accelerator allocation optimal solution such that the variance of the ratio between the APLs is reduced.

In the server control apparatus 100, the optimization arithmetic unit 130 performs arithmetic of the ratio in accordance with Equation (3) above.

This makes it possible to more easily calculate the accelerator allocation optimal solution such that the variance of the ratio between the APLs is reduced in the case that the APL i in a state of either using or not using the FPGA is located on each of all the servers.

In the server control apparatus 100, the optimization arithmetic unit 130 optimizes the allocation of the accelerator in the ranges of the capacity conditions indicated by Relationship (4) and Relationship (5) above.

This makes it possible to calculate the accelerator allocation optimal solution such that the variance of the ratio between the APLs is reduced without exceeding the accelerator capacity or the software capacity on the server.

In the server control apparatus 100, the optimization arithmetic unit 130 performs the optimization arithmetic that minimizes the divergence of the ratio.

This makes it possible to optimize the allocation of the accelerator such that the variance of the ratio between the APLs is reduced by performing the optimization arithmetic that minimizes the divergence of the ratios.

Note that the server control apparatus 100 according to the present embodiment, more specifically, includes the request and configuration collection unit 120 that acquires a request to offload a certain process of an application to an accelerator for each application in the physical server 30, and configurations of the accelerator and the application in the server, the optimization arithmetic unit 130 that determines, by referring to information of the acquired request and configurations of the physical server 30, a performance-to-request ratio (P/R) that is a ratio of processing performance to the request, and optimizes allocation of the accelerator so that variance of the performance-to-request ratio (P/R) between the applications is equal to or less than a predetermined threshold, the configuration determination unit 140 that determines a configuration suggestion to be taken by the physical server 30 by using an arithmetic result received and a predetermined policy, and the configuration command unit 150 that commands the physical server 30 to execute the configuration suggestion determined by the configuration determination unit 140.

In this manner, the server control apparatus 100 according to the present embodiment calculates the performance ratio to the request for each APL, and optimizes the allocation of the accelerator so that the variance of the performance-to-request ratio between the APLs is reduced. This allows the server control apparatus 100 according to the present embodiment to allocate more accelerators for the APL with relatively more requests to effectively utilize the accelerator and achieve the improvement in the throughput and availability of the overall cluster (physical servers).

Others

Among processes described in the embodiments, all or some of processes described as being performed automatically can be manually performed, or all or some of processes described as being performed manually can be performed automatically by well-known methods. In addition, information including the processing procedures, the control procedures, the specific names, and the various types of data, and various parameters described in the aforementioned document and drawings can be modified as desired unless otherwise specified.

In addition, components of the devices illustrated in the drawings are functionally conceptual and are not necessarily physically configured as illustrated in the drawings. That is, the specific aspects of distribution and integration of the devices are not limited to those illustrated in the drawings. All or some of the components may be distributed or integrated functionally or physically in desired units depending on various kinds of loads, states of use, and the like.

Some or all of the configurations, the functions, the processing units, the processing mechanisms, and the like may be realized in hardware by being designed, for example, in an integrated circuit. Each of the configurations, the functions, and the like may be realized in software for a processor to interpret and execute a program that implements the functions. Information such as programs, tables, files, and the like, which are for implementing the functions can be held in a recording apparatus such as a memory, a hard disk, and a Solid State Drive (SSD), or a recording medium such as an Integrated Circuit (IC) card, a Secure Digital (SD) card, and an optical disk. In the present specification, the processes describing the time sequential processes include parallel or individually performed processes (for example, parallel processing or object processing) without necessarily being processed sequentially, in addition to processing performed sequentially in described order.

REFERENCE SIGNS LIST

1 Network system
30 Physical server
31 APL control unit
32, 33 APL
34 Virtual patch panel
35 Accelerator
40 Switch (SW)
41 SW control unit
50 Intranet
100 Server control apparatus
110 Integrated control unit
111 Threshold table (threshold storage unit)
112 Policy table
113 Configuration information table
121 Total configuration table
122 Total request table
120 Request and configuration collection unit (acquisition unit)
130 Optimization arithmetic unit
140 Configuration determination unit (determination unit)
150 Configuration command unit
311 Configuration update unit
312 Request update unit
313 APL generation/deletion unit
314 Connection switching unit
315 Accelerator generation/deletion unit
316 Current configuration table
317 Current request table

The invention claimed is:

1. A server control apparatus comprising:
an acquisition unit comprising one or more processors and configured to acquire a request to offload a certain process of a first application of applications to an accelerator for each of the applications in a server, and configurations of the accelerator and the first application in the server;
an optimization arithmetic unit comprising the one or more processors and configured to determine, by referring to information of the request acquired and the configurations acquired of the server, a ratio of processing performance to the request, and optimize allocation of the accelerator based on a capacity condition of the accelerator, so that variance of the ratio between the applications is equal to or less than a predetermined threshold; and
a determination unit comprising the one or more processors and configured to determine a configuration suggestion for the server by using an arithmetic result from the optimization arithmetic unit and a predetermined policy, and command the server to execute the configuration suggestion, wherein the configuration suggestion comprises rewriting the certain process of the first application in the accelerator into a process of a second application, wherein an accelerator allocation of the first application is greater than an accelerator allocation of the second application,
wherein the optimization arithmetic unit is configured to perform arithmetic of the ratio in accordance with Equation (2) below, $$\left(\frac{P}{R}\right)_i = \left(\sum_j P_i \delta_{ij}^F + \sum_j p_i \delta_{ij}^S\right) / R_i \tag{2}$$

$\delta_{ij}^F$ IS 1 IF THE $APL$ $i$ USING AN ACCELERATOR IS
PRESENT ON THE SERVER $j$, OR 0 IF NOT PRESENT
$\delta_{ij}^S$ IS 1 IF THE $APL$ $i$ NOT USING AN ACCELERATOR
IS PRESENT ON THE SERVER $j$, OR 0 IF NOT PRESENT wherein
P presents a performance,
R represents the request,
P/R represents the ratio,
Pi represents a performance with the accelerator,
pi represents a software performance, and
$\delta^F$ and $\delta^S$ represent delta functions.

2. The server control apparatus according to claim 1, further comprising:
a threshold storage unit provided with a parameter of the ratio among at least one of a divergence of the ratio, a minimum value of the ratio, or a maximum value of the ratio, and the threshold storage unit being configured to hold a threshold for applying the parameter,
wherein the optimization arithmetic unit is configured to perform optimization arithmetic by using the threshold for the parameter.

3. The server control apparatus according to claim 1, wherein the optimization arithmetic unit is configured to optimize allocation of the accelerator in ranges of capacity conditions indicated by Relationship (4) and Relationship (5) below, $$\sum_i C_i \delta_{ij}^F \leq S_j \tag{4}$$

A CONDITION THAT THE ACCELERATOR
CAPACITY ($S_j$) ON THE SERVER $j$ IS NOT EXCEEDED $$\sum_i c_i \delta_{ij}^S \leq s_j \tag{5}$$

A CONDITION THAT THE SOFTWARE
CAPACITY ($s_j$) ON THE SERVER $j$ IS NOT EXCEEDED wherein
Ci represents an FPGA required capacity,
ci represents a software required capacity,
Sj represents an accelerator capacity on a server j,
sj represents a software capacity on the server j, and
$\delta^F$ and $\delta^S$ represent delta functions.

4. The server control apparatus according to claim 1, wherein the optimization arithmetic unit performs an optimization arithmetic that minimizes a divergence of the ratio.

5. A server control method comprising:

acquiring a request to offload a certain process of a first application of applications to an accelerator for each of the applications in a server, and configurations of the accelerator and the first application in the server;

determining, by referring to information of the request acquired and the configurations acquired of the server, a ratio of processing performance to the request, and optimizing allocation of the accelerator based on a capacity condition of the accelerator, so that variance of the ratio between the applications is equal to or less than a predetermined threshold; and determining a configuration suggestion for the server by using an arithmetic result obtained by the optimizing and a predetermined policy, and commanding the server to execute the configuration suggestion, wherein the configuration suggestion comprises rewriting the certain process of the first application in the accelerator into a process of a second application, wherein an accelerator allocation of the first application is greater than an accelerator allocation of the second application, wherein determining the ratio comprises performing arithmetic of the ratio in accordance with Equation (2) below, $$(P/R)_i = (\Sigma_j P_i \delta_{ij}^F + \Sigma_j p_i \delta_{ij}^S)/R_i \quad (2)$$

$\delta_{ij}^F$ IS 1 IF THE APL i USING AN ACCELERATOR IS PRESENT ON
THE SERVER j, OR 0 IF NOT PRESENT $\delta_{ij}^S$ IS 1 IF THE APL i NOT USING AN ACCELERATOR IS PRESENT
ON THE SERVER j, OR 0 IF NOT PRESENT wherein P presents a performance, R represents the request, P/R represents the ratio, Pi represents a performance with the accelerator, pi represents a software performance, and $\delta^F$ and $\delta^S$ represent delta functions.

6. A non-transitory computer readable medium storing a program stored in a recording medium, wherein execution of the program causes a computer to execute operations comprising:

acquiring a request to offload a certain process of a first application of applications to an accelerator for each of the applications in a server, and configurations of the accelerator and the first application in the server;

determining, by referring to information of the request acquired and the configurations acquired of the server, a ratio of processing performance to the request, and optimizing allocation of the accelerator based on a capacity condition of the accelerator, so that variance of the ratio between the applications is equal to or less than a predetermined threshold; and determining a configuration suggestion for the server by using an arithmetic result and a predetermined policy, and commanding the server to execute the configuration suggestion, wherein the configuration suggestion comprises rewriting the certain process of the first application in the accelerator into a process of a second application, wherein an accelerator allocation of the first application is greater than an accelerator allocation of the second application, wherein determining the ratio comprises performing arithmetic of the ratio in accordance with Equation (2) below, $$(P/R)_i = (\Sigma_j P_i \delta_{ij}^F + \Sigma_j p_i \delta_{ij}^S)/R_i \quad (2)$$

$\delta_{ij}^F$ IS 1 IF THE APL i USING AN ACCELERATOR IS PRESENT ON
THE SERVER j, OR 0 IF NOT PRESENT $\delta_{ij}^S$ IS 1 IF THE APL i NOT USING AN ACCELERATOR IS PRESENT
ON THE SERVER j, OR 0 IF NOT PRESENT wherein P presents a performance, R represents the request, P/R represents the ratio, Pi represents a performance with the accelerator, pi represents a software performance, and $\delta^F$ and $\delta^S$ represent delta functions.

* * * * *